United States Patent

Hino et al.

[11] Patent Number: 6,078,767
[45] Date of Patent: Jun. 20, 2000

[54] IMAGE PROCESSING APPARATUS CAPABLE OF EASILY DESIGNATING IMAGE TO BE EDITED

[75] Inventors: Hideki Hino, Toyokawa; Kazuo Okunishi, Okazaki; Kentaro Nagatani; Yoshiaki Takano, both of Toyohashi, all of Japan

[73] Assignee: Minolta Co., Ltd., Osaka, Japan

[21] Appl. No.: 09/114,909

[22] Filed: Jul. 14, 1998

[30] Foreign Application Priority Data

Jul. 23, 1997 [JP] Japan .................................. 9-197259

[51] Int. Cl.⁷ .................................................. G03G 15/36
[52] U.S. Cl. ............................................. 399/182; 399/183
[58] Field of Search ................................. 399/182, 183, 399/184, 185, 186, 187, 298, 81; 345/173, 179; 358/448, 452, 453, 300, 443; 382/309, 310, 311, 181, 209

[56] References Cited

U.S. PATENT DOCUMENTS

| | | | |
|---|---|---|---|
| 4,538,182 | 8/1985 | Saito et al. | 358/538 |
| 4,734,789 | 3/1988 | Smith et al. | 399/182 X |
| 4,856,074 | 8/1989 | Nagaoka | 382/180 |
| 4,881,130 | 11/1989 | Hayashi | 358/443 |
| 4,984,020 | 1/1991 | Adachi et al. | 399/184 |
| 4,992,828 | 2/1991 | Liston | 399/184 |
| 5,335,095 | 8/1994 | Kageyama et al. | 358/500 |
| 5,515,144 | 5/1996 | Miyasaka et al. | 399/182 X |
| 5,671,429 | 9/1997 | Tanaka | 399/183 X |
| 5,825,944 | 10/1998 | Wang | 382/309 |
| 5,923,792 | 7/1999 | Shyu et al. | 382/309 |

FOREIGN PATENT DOCUMENTS 62-154845  7/1987  Japan .
4-80885   3/1992  Japan .

*Primary Examiner*—Matthews S. Smith
*Assistant Examiner*—Hoan Tran
*Attorney, Agent, or Firm*—Burns, Doane, Swecker & Mathis, LLP

[57] ABSTRACT

A copying machine inputs a designated area to which image processing is applied as well as details of the image processing. The copying machine recognizes a character included in the designated area. A character which is the same as the recognized character is retrieved from image data and the retrieved one is subjected to the image processing. Accordingly, by designating a character at one location, the image processing is applied to all of the other characters.

20 Claims, 36 Drawing Sheets

FIG. 7

| MEMORY | MEMORY PLANE | BLACK-AND-WHITE DOCUMENT | COLOR DOCUMENT | BLACK-AND-WHITE + COLOR DOCUMENT |
|---|---|---|---|---|
| EDITING AREA DESIGNATION MEMORY | BIT 15 | 1ST–15TH CHARACTERS/ BASE PROCESSING AREA CODES  * 1ST–15TH CHARACTERS/ BASE PROCESSING AREAS ARE ALLOCATED TO BITS 15-1 | 1ST–6TH CHARACTERS/ BASE PROCESSING AREA CODES  * 1ST–6TH CHARACTERS/BASE PROCESSING AREAS ARE ALLOCATED TO BITS 15-10 | 1ST–14TH FOR FIT IN COMBINATION  • CHARACTER COMBINED-BLACK-AND-WHITE DOCUMENT WINDOW FOR EDITING DESIGNATED AREA CODE  * 1ST–14TH FIT IN COMBINED/ CHARACTER COMBINED-BLACK-AND-WHITE DOCUMENT EDITING-WINDOW DESIGNATION AREA IS ALLOCATED TO BITS 15-2 |
|  | BIT 14 |  |  |  |
|  | BIT 13 |  |  |  |
|  | BIT 12 |  |  |  |
|  | BIT 11 |  |  |  |
|  | BIT 10 |  |  |  |
|  | BIT 9 |  | 1ST–4TH COLOR CHANGE AREA CODES  * 1ST–4TH COLOR CHANGE AREAS ARE ALLOCATED TO BITS 9-6 |  |
|  | BIT 8 |  |  |  |
|  | BIT 7 |  |  |  |
|  | BIT 6 |  |  |  |
|  | BIT 5 |  | 1ST–3RD MONOCHROME AREA CODES  * 1ST–3RD MONOCHROME AREAS ARE ALLOCATED TO BITS 5-3 |  |
|  | BIT 4 |  |  |  |
|  | BIT 3 |  |  |  |
|  | BIT 2 |  | PATTERNING AREA CODE |  |
|  | BIT 1 |  | NEGATIVE/POSITIVE REVERSING AREA CODE | ← |
|  | BIT 0 | ERASE AREA CODE |  | IMAGE COMBINING DESIGNATION AREAS  0: OVERLAP COMBINATION  1: FIT IN/CHARACTER COMBINATION  2: IMAGE ERASING  3: NON-SELECTED (SCANNER IMAGE) |

626

DOCUMENT

MEMORY 620

FIG. 12

| MEMORY | MEMORY PLANE | BLACK-AND-WHITE DOCUMENT | COLOR DOCUMENT | BLACK-AND-WHITE + COLOR DOCUMENT |
|---|---|---|---|---|
| CLOSED LOOP·MARKER DETECTION/ LCD DISPLAY DOCUMENT MEMORY | BIT 7 | BLACK-AND-WHITE GRADATION DATA FOR DISPLAY | LCD DISPLAY CODES | LCD DISPLAY CODES |
| | BIT 6 | | | |
| | BIT 5 | | | |
| | BIT 4 | | | |
| | BIT 3 | MARKER COLOR CODES 0:NON 1:R 2:G 3:B 4:C 5:M 6:Y | | |
| | BIT 2 | | | |
| | BIT 1 | | | |
| | BIT 0 | BLACK-AND-WHITE BINARIZED DATA | | |

620

AREA DESIGNATION TOOL

MARKER AREA DESIGNATION TOOL

ROUND RECTANGLE (A) BASIC PROCESSING (B) AREAS CROSSING (A) BASIC PROCESSING (B) CLOSED LOOP IN CLOSED LOOP (C) OUTSIDE CLOSED LOOP DESIGNATED

IMAGE PROCESSING APPARATUS CAPABLE OF EASILY DESIGNATING IMAGE TO BE EDITED

This application is based on application No. 9-197259 filed in Japan, the content of which is hereby incorporated by reference.

BACKGROUND OF THE INVENTION

1. Field of the Invention

The present invention relates to an image processing apparatus, and more particularly, to an image processing apparatus having an image edit function.

2. Description of the Related Art

An image forming apparatus is known which executes, when a region within a read image is designated, edit processing (e.g. coloring, enlargement, reduction, black/white reverse and so on) for an image in the region.

There are some cases in which all of the same characters in a document are desired to undergo edit processing by such a conventional image forming apparatus. A problem in such cases is that designation of all regions having the characters is required, resulting in a complicated setting procedure.

SUMMARY OF THE INVENTION

The present invention is made to solve such a problem. An object of the invention is to provide an image processing apparatus capable of easily designating what is subjected to edit processing even if there are a plurality of regions to which edit processing is applied.

In order to achieve the object described above, an image processing apparatus according to one aspect of the invention includes a unit for inputting an image, a unit for designating an arbitrary region in the image, a unit for recognizing an image in the designated region, a unit for detecting an image relating to the recognized image from the input image, and a unit for editing the detected image.

A method of processing an image according to another aspect of the invention includes the steps of inputting an image, designating an arbitrary region in the image, recognizing an image in the designated region, detecting an image relating to the recognized image from the input image, and editing the detected image.

According to the invention, an image in a designated region is recognized, an image relating to the recognized image is detected, and the detected image is edited. An image processing apparatus is thus provided capable of easily designating what is subjected to edit processing even if there are a plurality of regions to which edit processing is applied.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a table for use in illustration of how to use memory planes in the editing area designation memory;

FIG. 12 is a table showing how memory planes correspond to a document input to memory 620;

DESCRIPTION OF THE PREFERRED EMBODIMENTS

Figure 1:
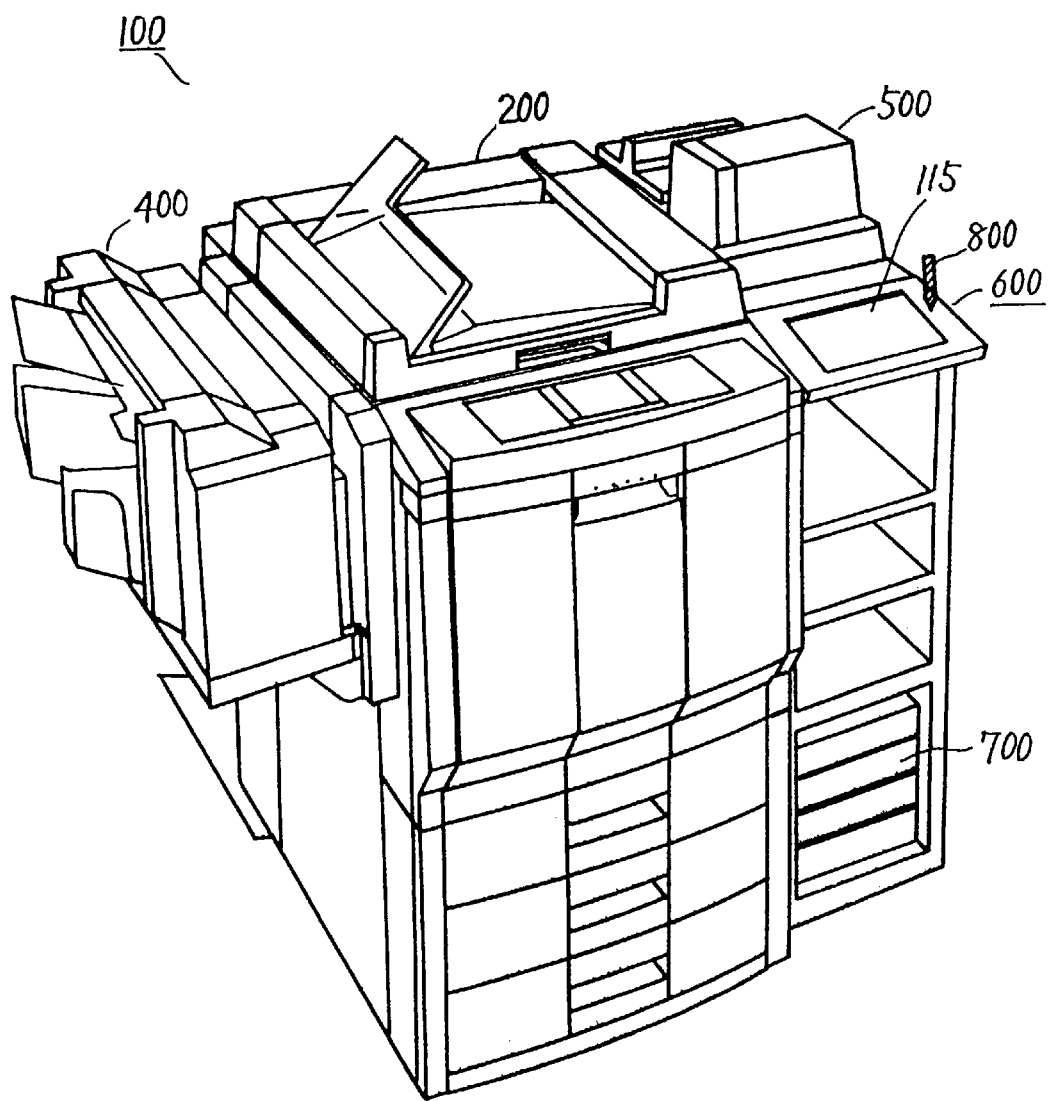
FIG. 1 is a perspective view showing a copying machine according to one embodiment of the invention.

Now, preferred embodiments of the invention will be described in conjunction with the accompanying drawings, in which like reference characters represent the same or corresponding portion.

FIG. 1 is a perspective view showing a digital color copying machine according to one embodiment of the invention.

Referring to FIG. 1, color copying machine 100 includes an automatic document feeder (ADF) for a large volume of documents, a sorter 400 for sorting copy sheets, a film projector 500 for making copies from a film document, a screen editor 600, characteristic to the color copying machine according to this embodiment, and a printer controller 700 connected to a personal computer or an EWS (work station) to use the copying machine as a color printer.

Screen editor 600 includes a color liquid crystal display (LCD) 115 which displays a read document and various operation menus for giving directions to the user in operation.

There is provided, on color LCD 115, a transparent tablet (touch panel) to detect coordinates indicated by the user, and the user can directly input coordinates on the color LCD to the machine using a pen 800.

Figure 2:
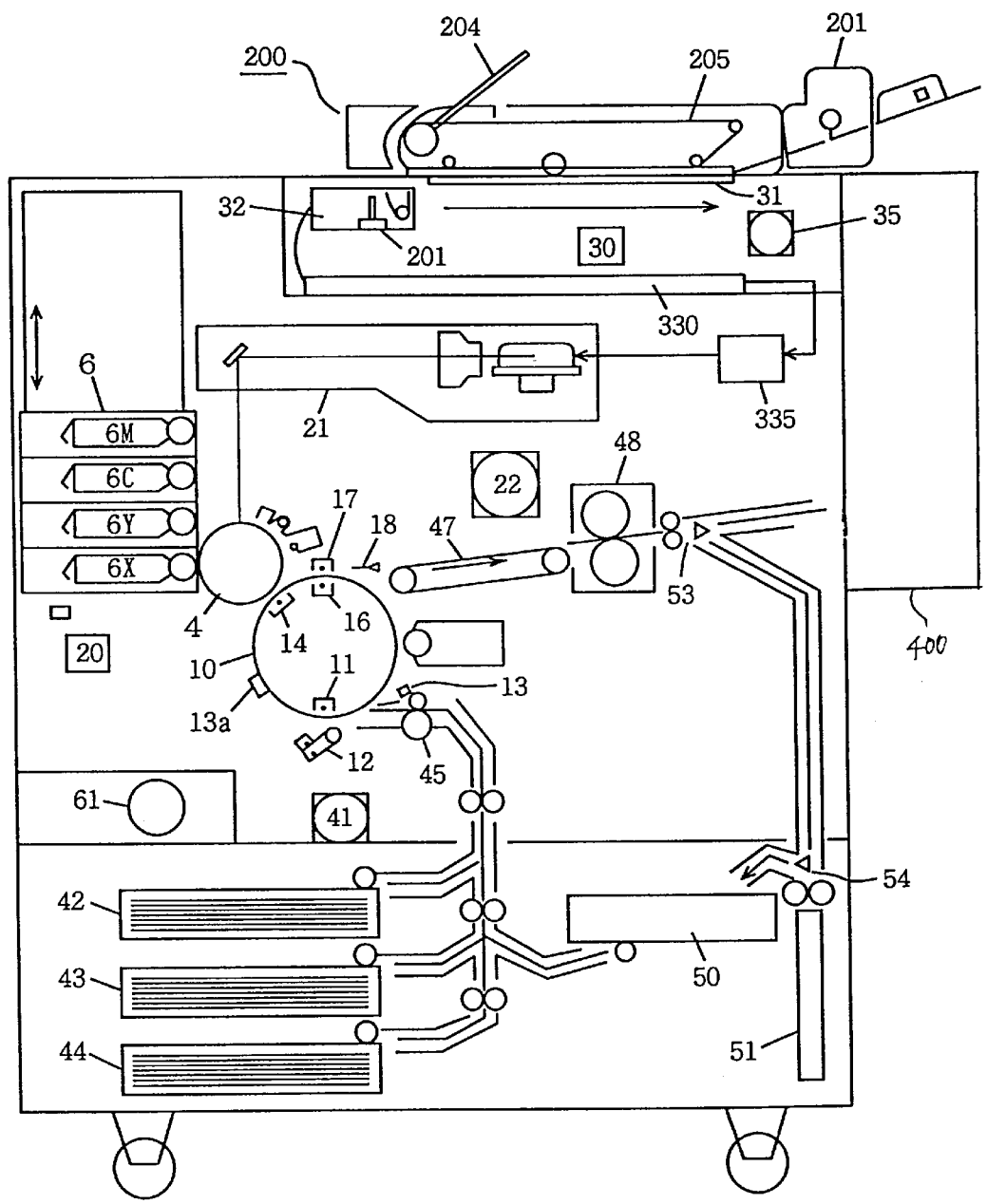
FIG. 2 is a cross sectional view showing the copying machine shown in FIG. 1.

FIG. 2 is a cross sectional view for use in illustration of the mechanism of the color copying machine shown in FIG. 1.

Referring to FIG. 2, the copying machine is roughly divided into automatic document feeder 200, an image reader portion 30, and a printer portion 20.

Automatic document feeder (ADF) 200 is roughly structured of a document dispatch portion 201 keeping documents and sending them one by one, and a document transport portion in which a transferred document is passed onto the top surface of a platen 31 by a transport belt 205, the document is stopped at a prescribed position on platen 31, and the document is sent onto a discharge tray 204 after scanning of the document is completed. The document transport portion can be used as an independent document transport unit used by manual feeding. Further, the document transport portion can be opened/closed to copying machine 100 to expose platen 31 while mounted on the body of copying machine 100, and accordingly can be used similarly to an ordinary document cover.

Next, image reader portion 30 and printer portion 20 are described.

(1) Image Reader Portion 30

Image reader (IR) portion 30 includes platen 31 to place a document, a scanner 32 to scan a document by exposure, an image sensor (CCD) 201 to sense light reflected from a document, an image signal processing portion 330 to process a signal from the image sensor, a print head (PH) control portion 335 to output a control signal to the printer portion based on a signal from the image signal processing portion, and a pulse motor 35 to drive scanner 32.

The image of a document placed on platen 31 is exposed to light and scanned, and light reflected from the image is photoelectrically converted by image sensor 201. The signal resulting from the photoelectric conversion is subjected to a prescribed processing in image signal processing portion 330, and digital image data for driving a laser diode is produced. Thus produced digital image data is transmitted to print head control portion 335.

(2) Printer Portion 20

Printer portion 20 is roughly divided into an image forming portion and a developing unit portion, and a sheet processing portion, each of which will be separately described.

(a) Image Forming Portion

The image forming portion includes a laser device 21 driven based on the digital image data transmitted from image reader portion 30, a photoreceptor drum 4 to write an electrostatic latent image, a developing unit 6 for development with toner, a transfer drum 10 to transfer an image onto a surface of a sheet, and a drum drive motor 22 to drive the photoreceptor drum and transfer drum.

Laser device 21 is driven based on input digital image data. By driving laser device 21, an electrostatic latent image forms on the surface of photoreceptor drum 4. The electrostatic latent image is developed with toner by developing unit 6, and transferred onto a surface of a printing sheet placed on transfer drum 10.

Note that photoreceptor drum 4 and transfer drum 10 are driven in synchronization with each other by drum drive motor 22.

(b) Developing Unit 6

Developing unit 6 includes a magenta developer 6M for development with magenta toner, a cyan developer 6C for development with cyan toner, a yellow developer 6Y for development with yellow toner, a black developer 6K for development with black toner, four toner hoppers for supplying toner of a color corresponding to each developer, and a developing unit motor 61 for moving developing unit 6 in upward and downward directions.

(c) Sheet Processing Portion

The sheet processing portion includes storage cassettes 42–44 for storing sheets for printing, and an intermediate storage portion 50 for temporarily storing a sheet.

A sheet taken out from any of storage cassettes 42–44 or a sheet supplied from intermediate storage portion 50 is sent to transfer drum 10 by a group of transport rollers and wound around transfer drum 10. Then, toner images on photoreceptor drum 4 (in four colors at most) are sequentially transferred onto the sheet.

The sheet with the transferred image is separated from transfer drum 10, followed by fixing at a fixing device 48 and discharged onto a sorter 400.

The machine is provided with a pair of timing rollers 45 for providing timing for registration at the time of transporting the sheet and a transfer belt 47.

Note that the group of transport rollers and transfer belt 47 are driven by main motor 41.

Transfer drum 10 is provided with a tip chuck claw for chucking the tip of a sheet, an attraction charger 11 electrostatically attracting the sheet to transfer drum 10, a roller 12, a press-roller 12 for press-holding the sheet, a transfer charger 14 for sucking a toner image appearing on the photoreceptor drum onto the sheet for transfer, dischargers 16, 17 for electrically discharging the transfer drum to separate the sheet therefrom after the toner image has been transferred (the toner images for four colors have been transferred in the case of full color development), and a separation claw 18 for removing the sheet from the transfer drum.

The sheet after the above printing steps is brought into intermediate storage portion 50.

Whether to transport the sheet after the printing steps to discharge tray 49 or to intermediate storage portion 50 is determined based on the switching of a transport path switch portion 53 provided in the path transporting the sheet after the fixing processing.

Another transport path switching portion 54 is provided in the transport path toward intermediate storage portion 50. Transport path switching portion 54 selects whether to store the sheet into intermediate storage portion 50 after transporting the sheet in a switched back manner by a reversing device 51, or directly into intermediate storage portion 50.

Such selection is made for the purpose of determining whether to transfer an image on the side of the sheet which has been already printed (such transfer mode is called "image overlapped mode") or to transfer the image on the back side (which is called "duplex copy mode"), when the sheet supplied from intermediate storage portion 50 is once again transferred to the transfer drum.

The transfer drum is further provided with a reference position sensor 13 for detecting the reference position of the transfer drum, and an actuator plate 13a for operating the reference position sensor.

The operations of their image reader portions and printer portions will be described later.

Figure 3:
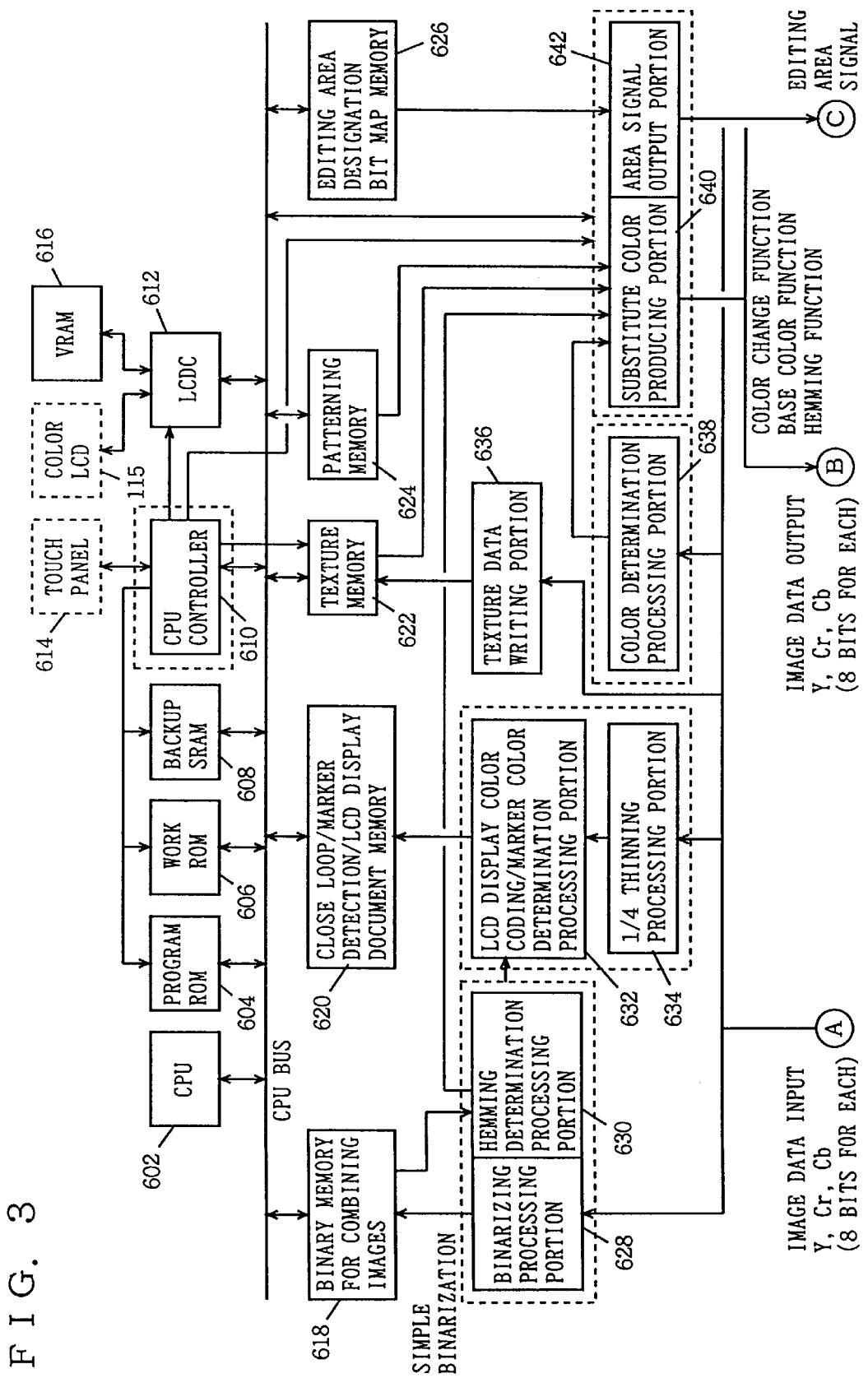
FIG. 3 is a block diagram showing a screen editor included in the copying machine shown in FIG. 1.
Figure 4:
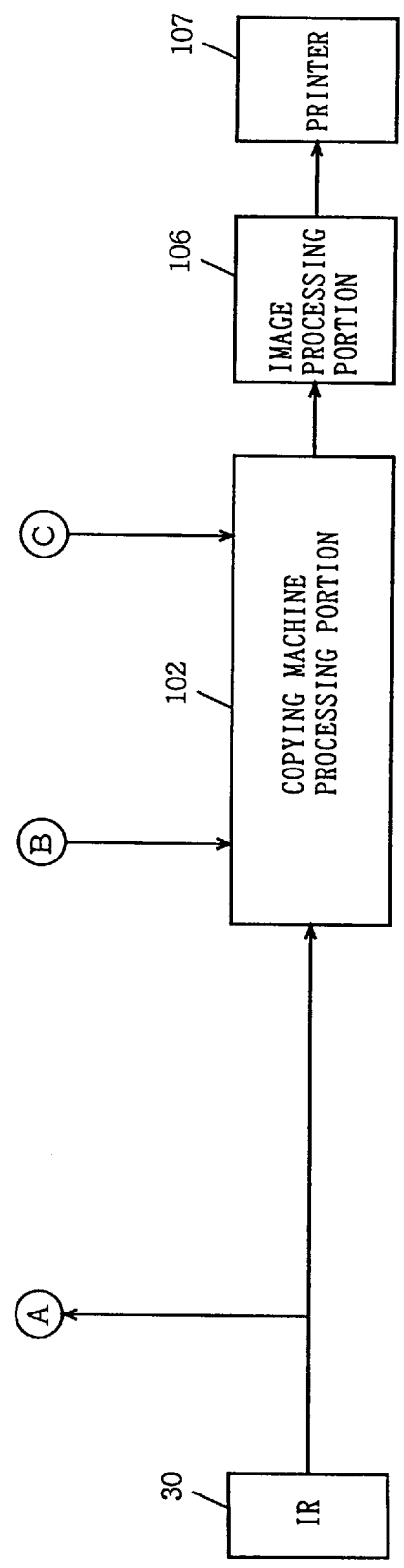
FIG. 4 is a block diagram showing a main portion of the copying machine shown in FIG. 1.

FIG. 3 is a block diagram showing an electronic circuit for image processing included in the screen editor in the copying machine shown in FIG. 1, and FIG. 4 is a block diagram showing an image processing circuit included in the main body of the copying machine. FIGS. 3 and 4 are connected at positions A, B and C.

Referring to FIG. 3, the screen editor includes the following elements.

(a) Binary Memory for Combining Images (618)

The memory 618 stores a binary signal of a signal representing the luminance of document information (Y). The image of a black-and-white document is stored in the memory, and used as character information when combined with a color document (character combining function).

(b) LCD Display Document/Closed Loop•Marker Detection

Memory (620)

In the color document editing mode, the memory converts document information into data to be input to the color pallet of the LCDC (LCD Controller) for display on the LCD and stores the data thinned to 100 dpi. More specifically, the number of colors in a document image is reduced to the number which can be displayed on the LCD and stored.

In the black-and-white document editing mode, the memory thins binary signals of 1 bit black-and-white (closed loop detection) information, 3 bit color information (R, G, B, C, M, Y) and 4 bit black-and-white gradation (for display) in a document to 100 dpi for storing.

Document information within the memory is transferred to a VRAM by the CPU for display.

In the black-and-white editing mode, the CPU detects a closed loop, a marker point position, and a marker closed loop in the document based on the information within the memory and produces editing area designation information.

As described above, the memory advantageously changes the method of storing based on the mode selected.

(c) Editing Area Designation Memory (626)

In the memory, 16 kinds of editing area signals are set as bit map information by the CPU based on coordinate designation from closed loop marker detection memory 620 and the touch panel 614 of the editor. The output of area signals is controlled separately among editing functions based on the editing area information within the memory.

(d) Texture Memory (622)

The memory stores various patterns read from documents for later use in the background or the like of a document, and data for processing background gradation. The background gradation processing data is set by the CPU. Based on image data stored in the memory, a color document is provided with patterns and the background gradation processing for a black-and-white document is performed. The memory has a maximum scanning cycle (horizontal scanning) of 128 dots, a vertical scanning cycle of 256 dots, and a gradation (luminance) of 256 levels.

(e) Patterning Memory (624)

The memory stores binary data in the form of patterns for patterning processing. The pattern form binary data stored in the memory are used for patterning a black-and-white document. The pattern form binary data in the memory is set by the CPU. The memory has a pattern size of 128 dots (horizontal scanning) and 256 dots (vertical scanning) and there are eight kinds of patterns.

(f) Binarizing Portion (628)

The binarizing portion writes a simple binary output of a write signal (Y) from document input data to binary memory 618 during prescanning. During image reproducing scanning, the simple binary output of write signal (Y) from the document input data is output to a substitute color data producing portion 640 as character region determination data.

During the image reproducing scanning, the binary outputs of luminance signal (Y) and color saturation signal (G) of the document input data are output to substitute color data producing portion 640 as base region determination data.

(g) Hemming Determination Portion (630)

The hemming/cut out of image data in the area designated by the editing area signal is determined, and the determination information is output to substitute color data producing portion 640. During the hemming determination, prescribed determinations are made for the following functions.

Hemming function: the hemming edge of a binarized input image is detected, and the edge determination information is output to the substitute color data producing portion.

Cut out function: the inner edge of the binarized input image is detected, and the edge determination information is output to the substitute color data producing portion.

(h) Marker Color Determination•LCD Display Image Data Coding Processing Portion (632)

In the black-and-white document editing mode, during prescanning, document input data is divided into seven kinds, i.e., black-and-white and colors (R, G, B, C, Y and M) and output to LCD display document/closed loop marker detection memory 620.

In the color document editing mode, during prescanning, document input data is converted to color codes for LCD display, and output to the LCD display document/closed loop•marker detection memory 620.

Data is written into LCD display document/closed loop marker detection memory 620 for each 4 lines in the vertical scanning valid period.

Marker color determination•LCD display is retrieved from an ROM using Y, Cr, Cb as address information. An ROM table (256K×8 bits) is installed for coding image data for marker color determination•LCD display.

(i) ¼ Thinning Processing Portion (634)

During prescanning, document input data is subjected to simple thinning for each 4 dots in the horizontal scanning direction, and the resulting data is output to marker color determination•LCD display image data coding processing portion 632.

(j) Texture Data Writing Portion (636)

During prescanning, the luminance signal (Y) of part of document input data (128×256 dots) is written into the texture memory.

(k) Color Determining Portion (638)

The color determining portion determines the colors of image data in the area designated by the editing area signal and outputs the determination information to substitute color data producing portion 640. The portion makes a prescribed determination for each function as color determination as follows.

Color change function: to determine whether an input image is of a designated document color and outputs the determination information to the substitute color data producing portion.

Texture function: to determine whether an input image is of a designated document color and the determination information is output to the substitute color data producing portion (designated color texture function).

Color determination portion 638 is provided with an ROM table for transforming color determination polar coordinates.

(1) Substitute Color Data Producing Portion (640)

The portion changes the colors of image data in an area designated by an editing area signal and outputs image data partly substituted by hemming editing instruction information. The substitute color data processing includes a prescribed conversion for each function as follows.

Color change function: a designated document color is changed to a designated substitute color (color region).

Texture function: a designated document color is changed into a texture memory data (color region).

Background color substitution function: a white region is changed into a region of a designated substitute color and a pattern (monochrome region).

Hemming function: the colors of an edge portion and an image inside the edge are changed into separate designated substitute colors (monochrome region).

(m) Area Signal Output Portion (642)

The area signal output portion changes an area signal designated by editing area memory 626 into an editing attribute signal to be output to the copying machine main body, and outputs an editing instruction signal to the hemming determination processing portion, color determination processing portion and substitute data producing portion. The attribute signal output to the copying machine main body is a monocolor/monochrome indication signal, negative/positive determination indication signal, or an image substitute/image erase/character combining indication signal.

(n) VRAM (616)

The VRAM is an image memory to store image data displayed on an LCD. Image data is written into the memory by the CPU. The image data within the memory is displayed on the LCD by the LCDC.

(o) LCDC (612)

The LCDC controls the LCD (VGA: 640×480/256 colors) and VRAM, and reads image data set in the VRAM for display on the LCD.

(p) CPU (602)

The CPU controls the display of LCD and produces editing area information.

(q) CPU Controller (610)

The CPU controller controls the address decoding and a bus when externally accessed. The controller controls input/output to/from the CPU through touch panel I/F.

(r) Program ROM (604)

The ROM stores programs for the CPU.

(s) Work RAM (606)

The RAM is for work/stack for the CPU.

(t) Backup SRAM (608)

The SRAM includes a built in battery to store backup parameters. The parameters are written by the CPU.

(u) Color LCD (115)

(v) Touch Panel (614)

Referring to FIG. 4, the copying machine main body includes an image reader 30, a copying machine processing portion 102 for converting a signal output from the image reader, an image processing portion 106 for processing a signal output from the copying machine processing portion 102, and a printer for printing an image corresponding to an output signal from the image processing portion.

Image reader 30 outputs 8 bit image data for each of Y, Cr and Cb. The output image data is input to the screen editor and copying machine processing portion 102. Copying machine processing portion 102 are provided with image data from image reader 30, 8 bit image data for each of Y, Cr and Cb output from the screen editor, and an editing area signal, and outputs processed image data.

Figure 5:
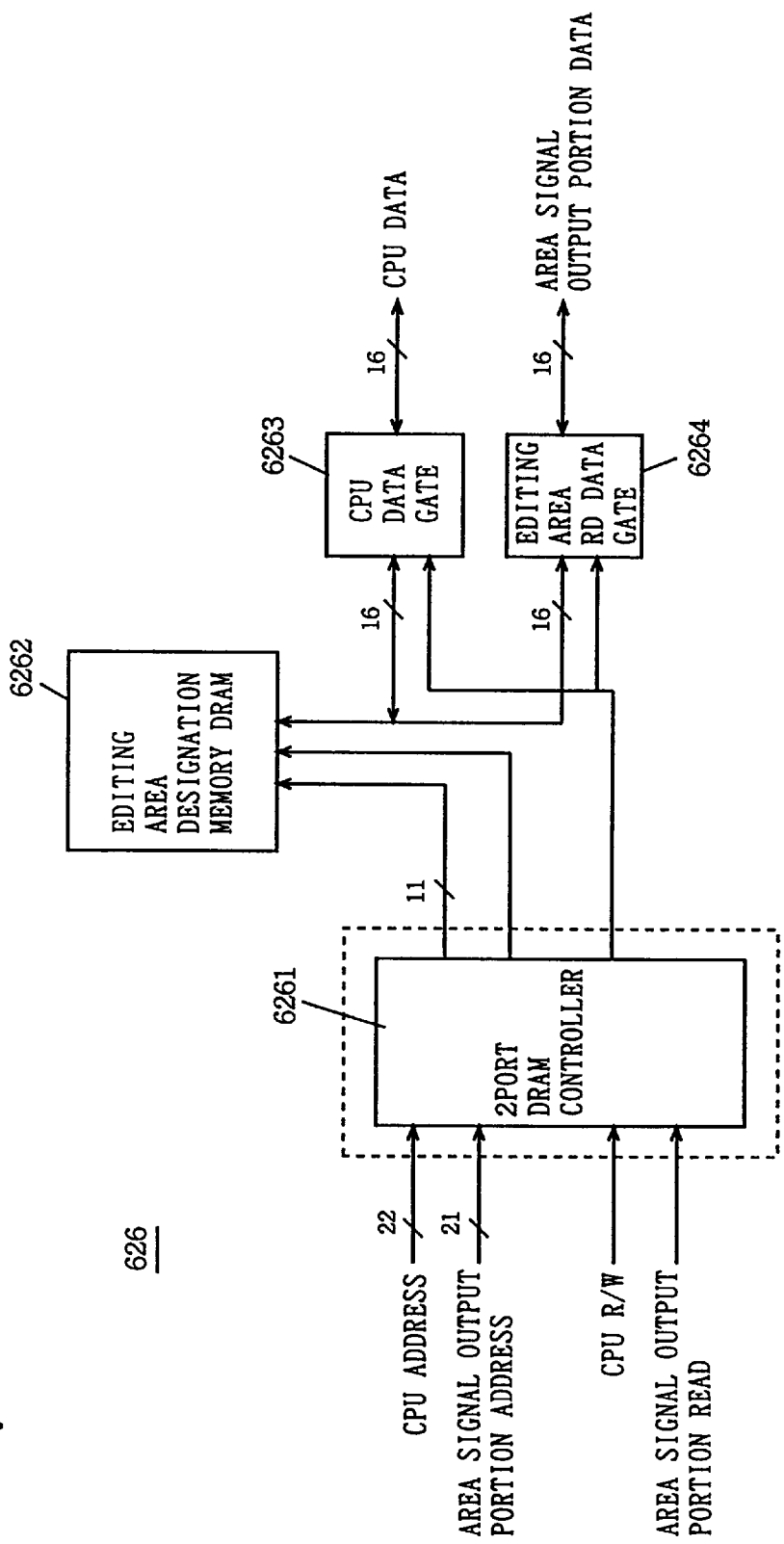
FIG. 5 is a block diagram showing the configuration of an editing area designation memory 626.

FIG. 5 is a block diagram showing in detail the configuration of editing area designation memory 626.

The memory thins binary signals of 1 bit for black-and-white and 3 bits for colors (R, G, B, C, M, Y) to 100 dots for storing. The memory also functions as a closed loop•marker detection memory. The memory also stores an editing area based on designated coordinates input through the touch panel. The memory stores 16 kinds of editing area signals as bit map information.

Editing area designation memory 626 includes a DRAM 6262, a controller 6261 for the DRAM, a CPU data gate 6263, and the data gate 6264 of the editing area signal output portion. DRAM controller 6261 is provided with a CPU address, an area signal output portion address, a CPU read/write signal, and data from the area signal output portion. CPU data gate 6263 exchanges data with the CPU. Editing area output portion data gate 6264 outputs data to area signal output portion 642.

Figure 6:
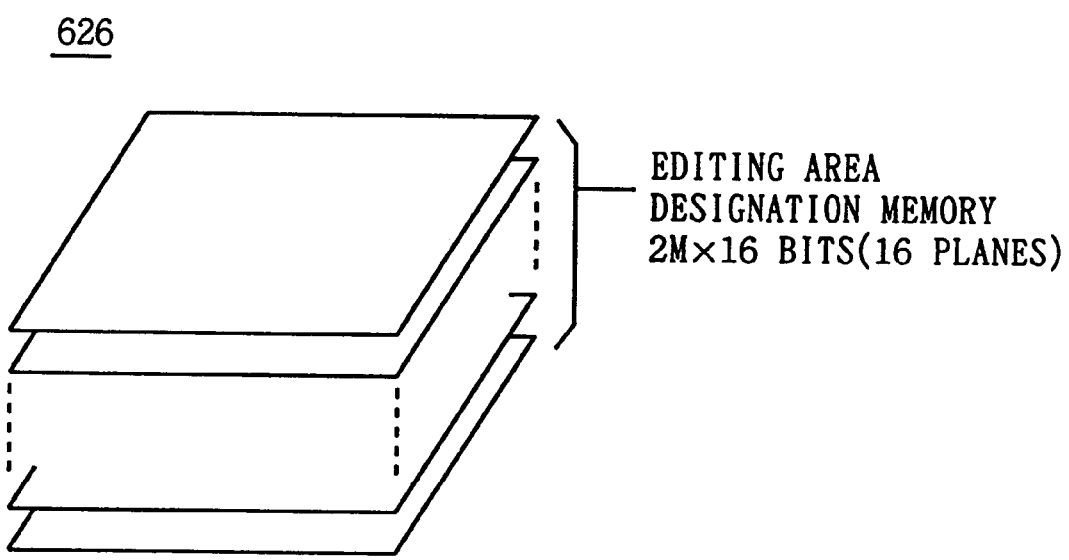
FIG. 6 is a view for use in illustration of the structure of editing area designation memory.

FIG. 6 is a diagram showing the planes of editing area designation memory. Referring to FIG. 6, the editing area designation memory is formed of 16 planes. One plane has a capacity of 2 Mbytes, and used to specify the position to edit in an input image data. The role of each plane in the editing area designation memory changes for each editing mode or each editing function.

FIG. 7 is a diagram showing how the memory planes of the editing area designation memory are allocated in each mode.

Referring to FIG. 7, the role of memory plane in each of bits 0 to 15 is described separately for the case of a black-and-white document, a color document, and black-and-white+color document.

Herein, the black-and-white document includes a document without coloring, and a black-and-white document having an area designated with a color marker by the user for the purpose of editing. The color document is a document such as a photograph. Black-and-white+color document is a document including both a black-and-white portion and a color portion.

Referring to FIG. 7, for a black-and-white document read, bit 0 is used as an erase area code. Herein, an image in a region designated by the erase area code is to be erased.

Bits 1 to 15 are used as the 1st to 15th character/base processing area codes. Thus, an editing processing corresponding to a region designated by each bit is executed.

If a color image document is input, bit 0 is used as an erase area code. Bit 1 is used as a negative/positive reversing area code. Bit 2 is used as a code for an area to be provided with patterns.

Bits 3 to 5 are used as first to third monochrome area codes to allocate first to third monochrome areas.

Bits 6 to 9 are used as first to fourth color change area codes to allocate first to fourth color change areas.

Bits 10 to 15 are used as first to sixth character/base processing area codes to allocate first to sixth character/base processing areas.

For a black-and-white+color document read, bits 0 and 1 are used as an image combining indication area. If the number indicated by bits 0 and 1 is "0", overlap combining is performed, for "1", fit in/character combining is performed, for "2", the image is erased, and for "3", no image is combined.

Bits 2 to 15 are used as area codes to allocate first to fourteenth fit in combining/character combining, editing within a black-and-white document and window designation areas.

Thus, the editing area designation memory is used in different ways based on the input image data.

Now, data stored in the editing area designation memory will be described by way of example.

Figure 8A:
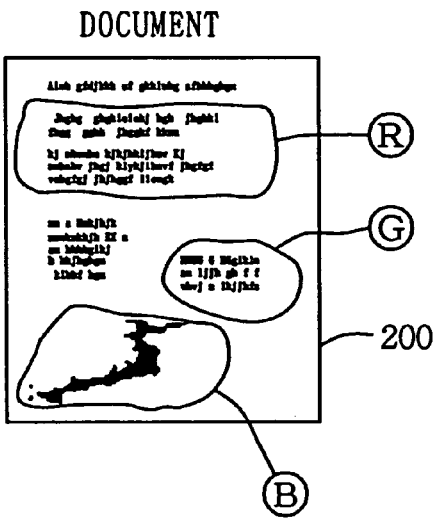
FIGS. 8A and 8B show the relation between a read document and data stored in the memory.

Referring to FIG. 8A, the processing will be detailed when there are regions surrounded by a red marker (R), a green marker (G), and a blue marker (B) in part of a black-and-white document read by the image reader.

The document is read by image reader 30, binarized at binarizing processing portion 628 and stored in closed loop/marker detection/LCD display document memory 620.

Figure 8B:
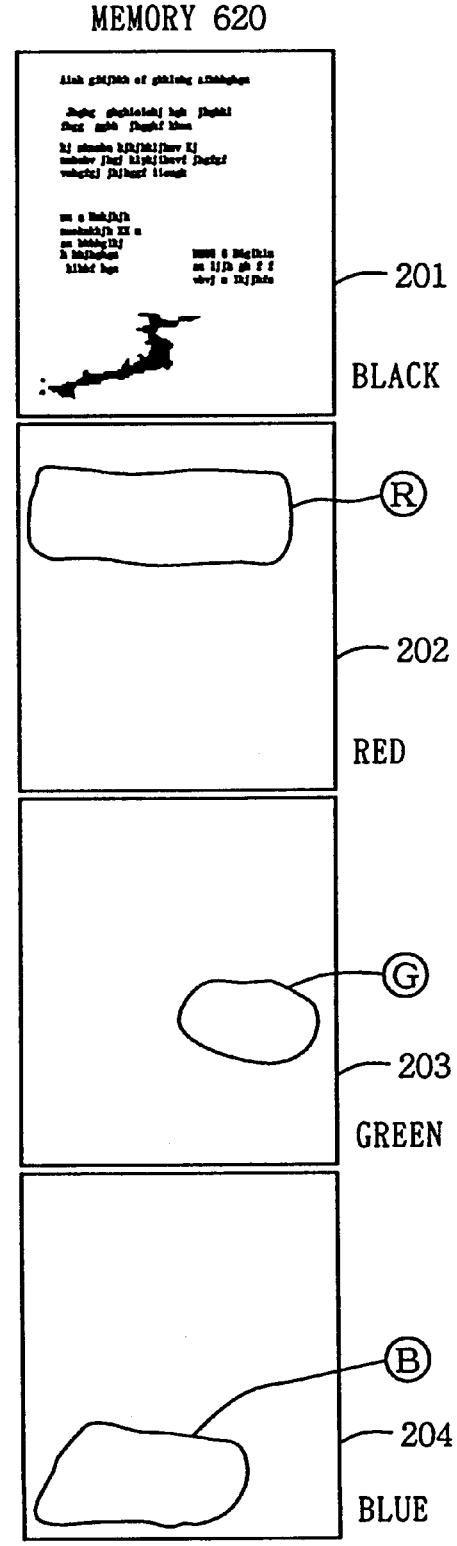

At the time, in memory 620, as shown in FIG. 8B, data for only the black-and-white portion of the document is stored in a plane 201 to store black data.

Meanwhile, in a plane to store the marker color code of each of red green and blue, as indicated by codes 202 to 204, only images in the portion corresponding to each marker color in the document are stored.

The document image stored in memory 620 is transferred to VRAM 616 through CPU 602, and then output to color LCD 115.

At the time, manually or by automatic setting with a device, whether to directly display the read document or to display an image after the image processing by the markers is selected.

Figure 9A:
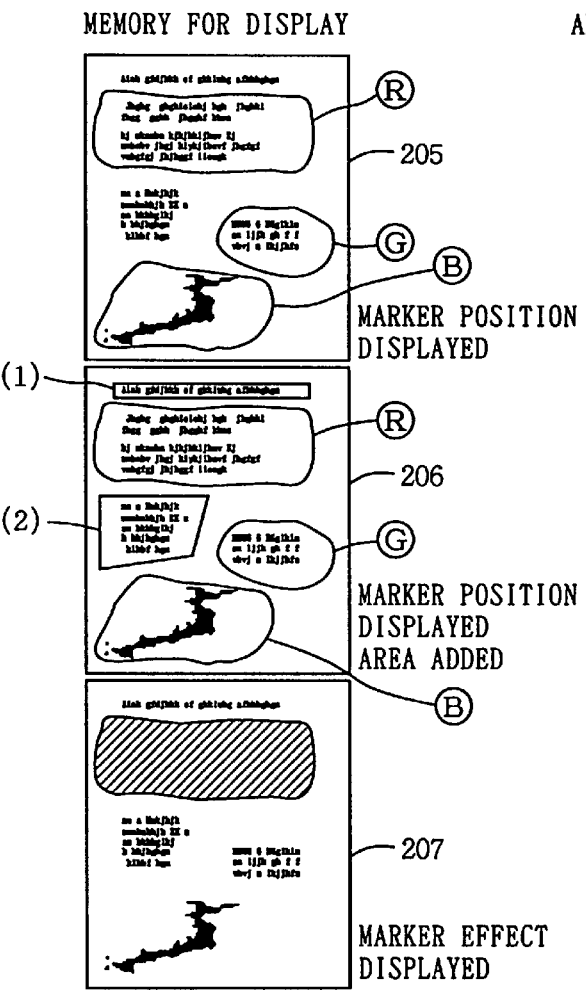
FIGS. 9A and 9B show the relation between data stored in the area designation memory and an image displayed on an LCD.

More specifically, referring to FIG. 9A, if the mode to directly display the figures delineated by the markers is selected, the image the same as the read document image is stored in the VRAM as shown in image 205, and displayed on color LCD 115.

Meanwhile, the mode to display the effect of image processing by markers (the mode to display an image after image processing) is selected, based on the color of the marker as indicated by image 207 and its position, an image after image processing will be displayed. Note that the region surrounded by the red marker is hatched, the region surrounded by the green marker is colored, and a figure in the region surrounded by the blue marker has been reduced.

As image 205 is displayed, the user can mark with markers to the image being displayed through touch panel 614. For example, the user can additionalily mark regions (1) and (2) to image 205 as in image 206 through touch panel 614.

More specifically, the user can know the states before and after image processing, make marking with markers for image processing through touch panel 614, which makes the machine easier to handle.

In editing area designation memory 626, data used for editing a black-and-white document is stored in each bit. More specifically, figures indicating editing regions set by marking with markers or input through the touch panel by the user are stored in the regions of bits 1 to 15.

Figure 9B:
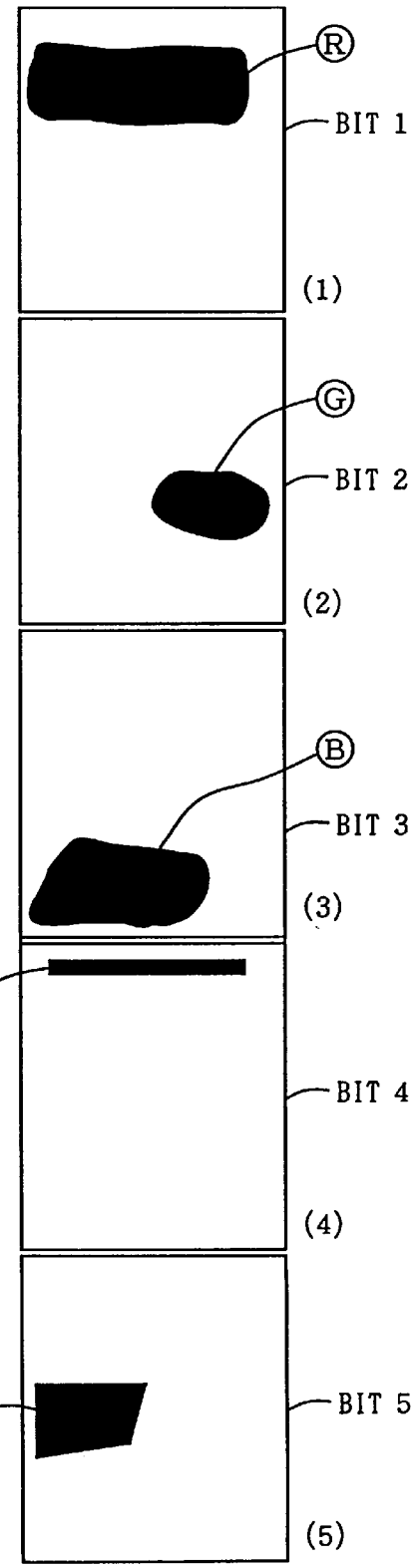

Now, let us assume that an editing area as indicated by code 206 in FIG. 9A is set. Referring to FIG. 9B, the region surrounded by red marker (R) drawn in a black-and-white document is stored in bit 1 in area designation memory 626 in the state in which the inside the region is painted out. Note that the painted out position is stored with data of "1", and otherwise data of "0" is stored.

Similarly, the regions surrounded by green (G) and blue (B) being painted out are stored in bits 2 and 3, respectively in area designation memory 626.

The region of portion (1) input through the touch panel is stored in bit 4 in the area designation memory as being painted out, and the region (2) input through the touch panel is stored in bit 5 as being painted out.

Area signal output portion 642 recognizes the painted out regions stored in the memory, identifies these painted out regions to be regions for image processing, and outputs an editing area signal to copying machine processing portion 102.

Figure 10:
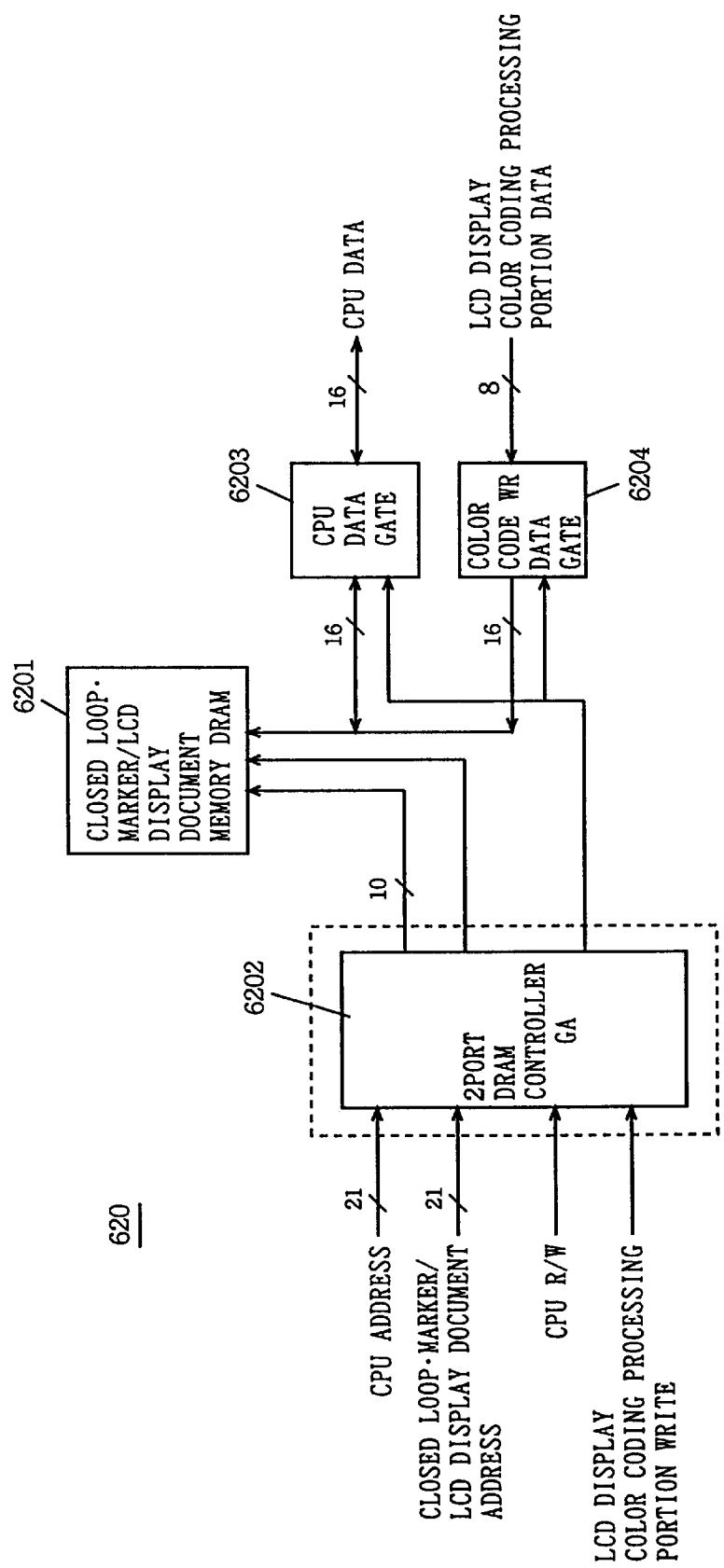
FIG. 10 is a block diagram showing the configuration of a closed loop/marker detection/LCD display document memory 620.

FIG. 10 is a block diagram specifically showing the configuration of closed loop•marker detection memory/LCD display document memory 620.

Referring to FIG. 10, the memory stores color coding data for closed loop marker determination data/LCD display which is produced by thinning document information to 100 dpi. The document information in the memory is transferred to the VRAM by the CPU and displayed on the LCD. In the black-and-white document mode, the closed loop•marker is detected by the CPU. The memory can be accessed by the CPU, the marker determination processing portion, and the LCD display color coding processing portion.

Referring to FIG. 10, memory 620 includes a DRAM 6201, a controller 6202 for the DRAM, a CPU data gate 6203, and a color code write/read data gate 6204.

DRAM controller 6202 is provided with a closed loop•marker/LCD display document address, a CPU write/read signal, and a write signal for the LCD display color coding processing portion.

CPU data gate 6203 exchanges data with the CPU. Color code WR data gate 6204 is provided with data from the LCD display color coding processing portion.

Figure 11:
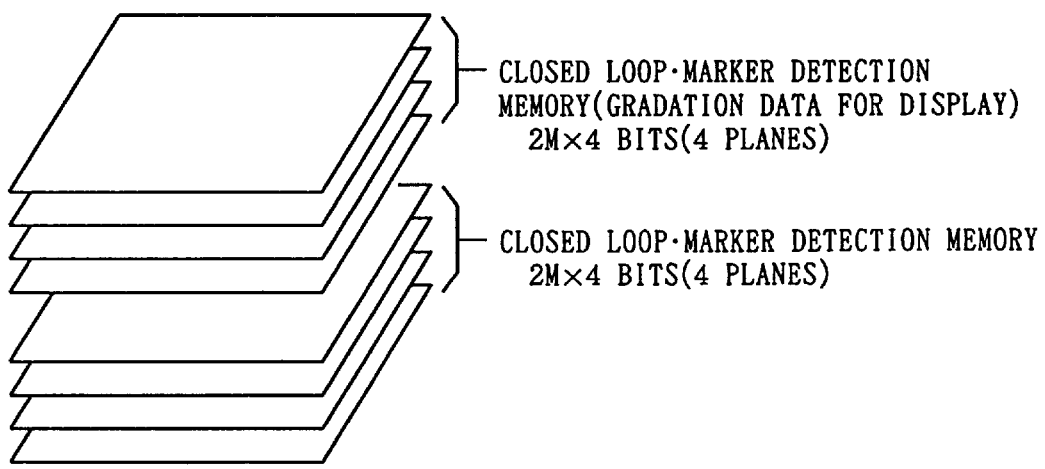
FIG. 11 is a view for use in illustration of the structure of memory 620 in a black-and-white document mode.

FIG. 11 is a diagram for use in illustration of the arrangement of planes in the closed loop•marker detection/LCD display document memory.

Referring to FIG. 11, there are eight layers of planes. The roles of these planes are different among different modes. FIG. 11 shows the arrangement of planes when an input document image is a black-and-white document image. Referring to FIG. 11, four planes are used for black-and-white gradation data for displaying the black-and-white document image on the LCD, and the other four planes are used as a memory for detecting closed loops and markers.

Meanwhile, for a color document or a black-and-white+color document, all the planes function as planes to store data for display on the LCD.

FIG. 12 is a diagram for use in illustration of how the role of a memory plane change depending upon the kind of a read document.

Referring to FIG. 12, as described above, for an input black-and-white document, memory planes of bits 4 to 7 are used for gradation data for displaying the black-and-white document, and bits 1–3 are used as codes for marker colors. The number "0" indicated by bits 1 to 3 represents a region without any marker, "1" a region in red, "2" a region in green, "3" a region in blue, "4" a region in cyan, "5" a region in magenta, and "6" a region in yellow.

The frame indicated by bit 0 is black-and-white binary data, and used to detect a closed loop present in the black-and-white document. Herein, the closed loop means a closed region delineated by a black line in the document. The user can designate the closed region by a marker or through type touch panel to color the region or hatch the region.

When an image in a read document is directly used as data to identify a closed loop, the line defining the closed loop may be sometimes disconnected depending on the characteristic of a CCD used and the closed loop may not be recognized successfully. As data in the plane of but 0, data produced by closing the line which defines the closed loop is stored. The closing processing will be described later.

Meanwhile, if a color document or a black-and-white+ color document is input, data for display on the LCD is stored in bits 0 to 7 in all the memory planes. More specifically, one dot will be displayed by 8 bit data on the LCD. The input color document has its tonality lowered to the tonality which can be represented by the LCD display codes and stored in the memory.

Figure 13:
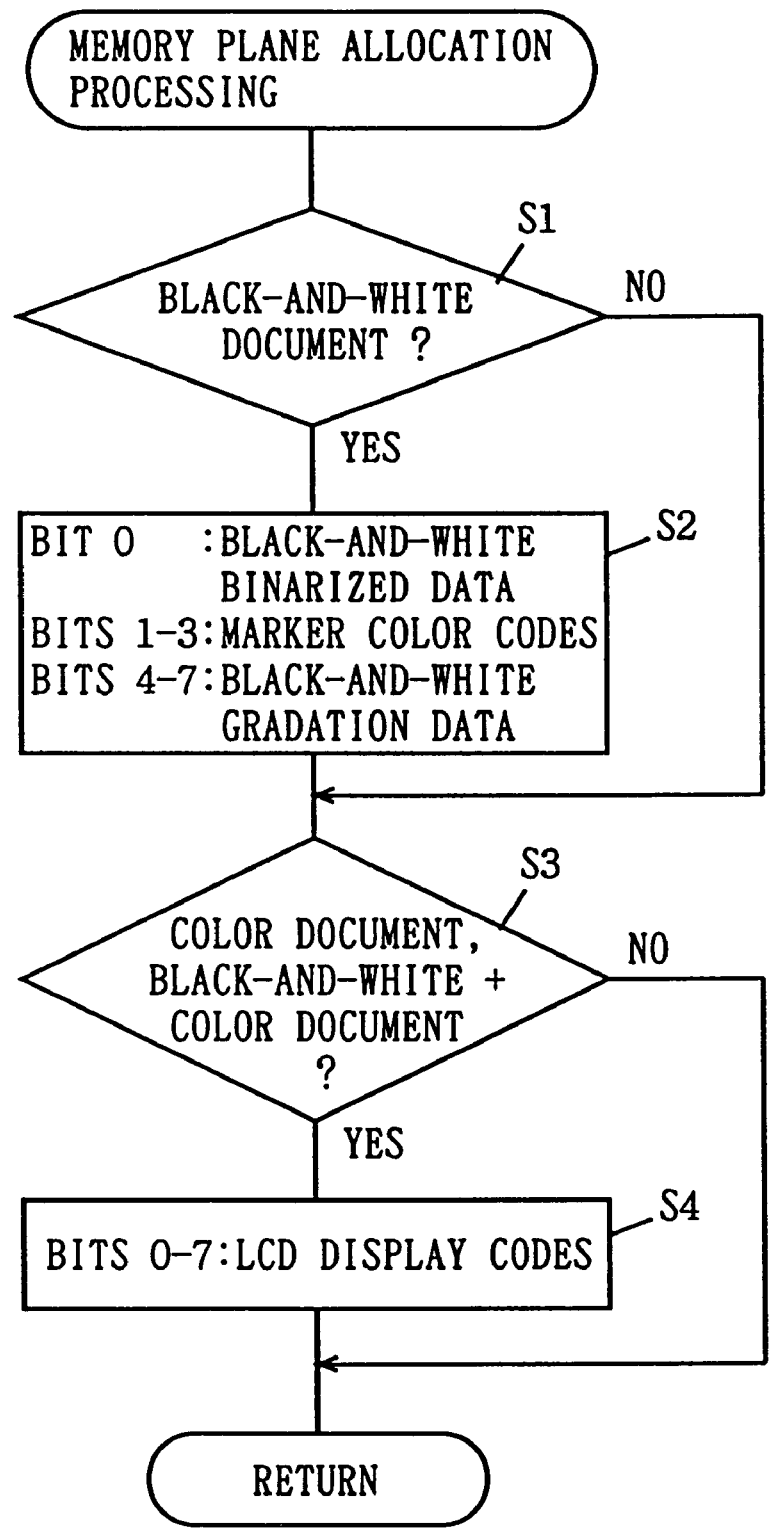
FIG. 13 is a flow chart for use in illustration of the processing of allocating memory planes.

Thus, the processing of switching the role of memory depending upon the content of an input document may be conducted by hardware, or maybe conducted by a flow as shown in FIG. 13.

Referring to FIG. 13, when the mode to process a black-and-white document is selected (YES in S1), the memory planes are allocated for the black-and-white document (S2). Meanwhile, the color document mode or the black-and-white+color document mode is set (YES in S3), the same memory planes for color are allocated (S4).

Figure 14:
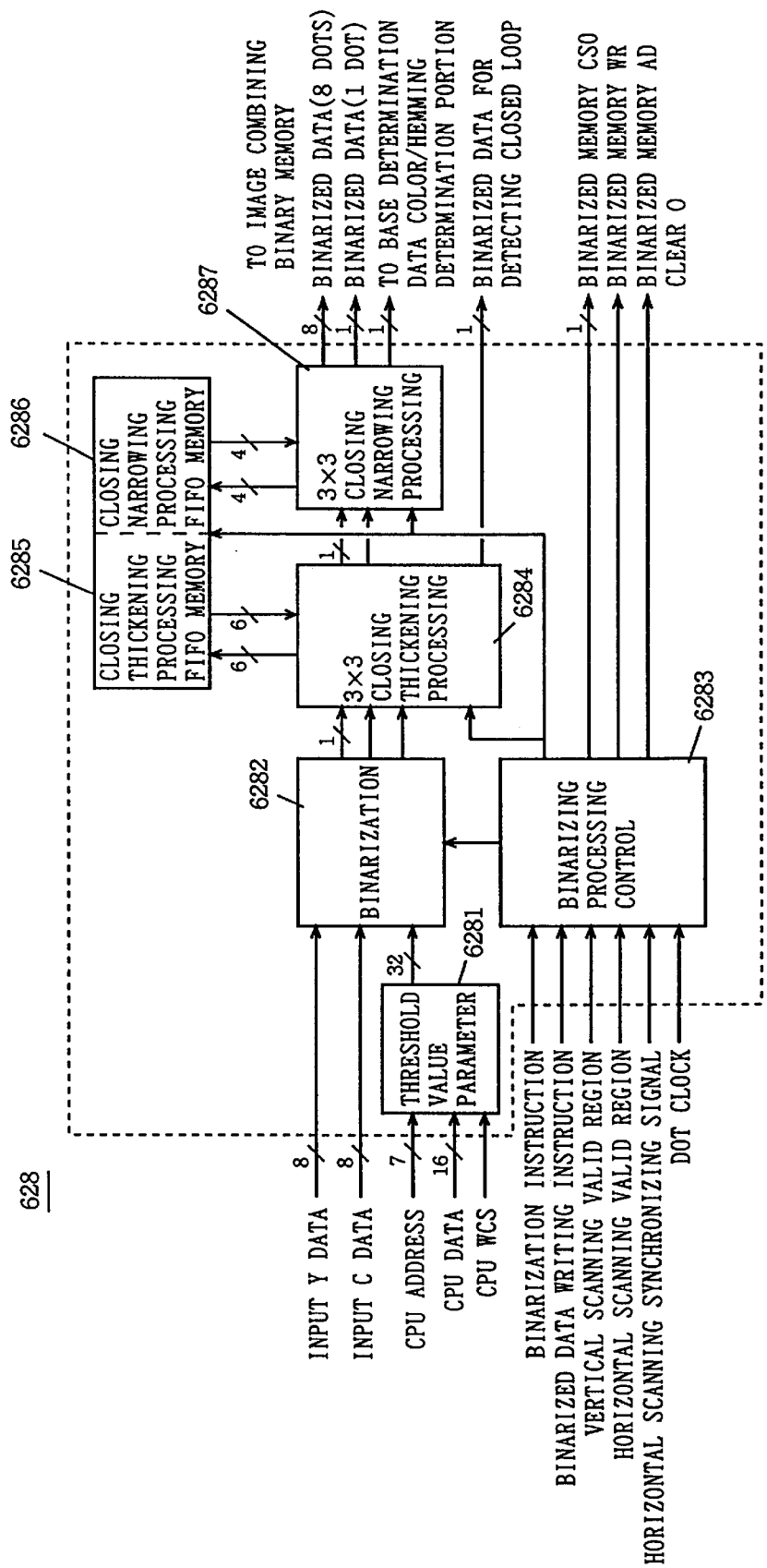
FIG. 14 is a block diagram showing the configuration of a binarizing processing portion 628.

FIG. 14 is a block diagram showing in detail the configuration of binarizing processing portion 628.

In the configuration, a binarized document image is produced based on the luminance signal (Y) and color saturation signal (C) of document information and threshold parameters. The binarized document image is subject to 3×3 dots closing processing and stored in the binary memory.

Referring to FIG. 14, the block includes a threshold parameter output portion 6281 for outputting threshold parameters, a binarizing processing portion 6282 for binarizing an input document image, a control portion 6283 for controlling the binarizing processing, a widening processing 6284 for widening the binarized document image for closing, a narrowing processing portion 6284 for narrowing the thickened document image, an FIFO memory 6285 used for the thickening processing and an FIFO memory 6286 for the narrowing processing.

Binarizing processing portion 6283 is provided with the luminance signal (Y) and color saturation (C) of document information. Threshold parameter output portion 6281 is provided with a CPU address, data from the CPU and a write clock signal from the CPU.

Binarizing processing control portion 6283 is provided with a binarizing instruction signal, a binarized data writing instruction signal, a vertical scanning valid region, a horizontal scanning valid region, a horizontal scanning synchronizing signal, and a dot clock.

Narrowing processing portion 6287 outputs binary data after closing, and base determination data. Widening processing portion 6284 outputs binary data for detecting a closed loop.

Binarizing processing control portion 6283 outputs a clock signal, a write signal and an address clear signal to the binary memory.

Figure 15:
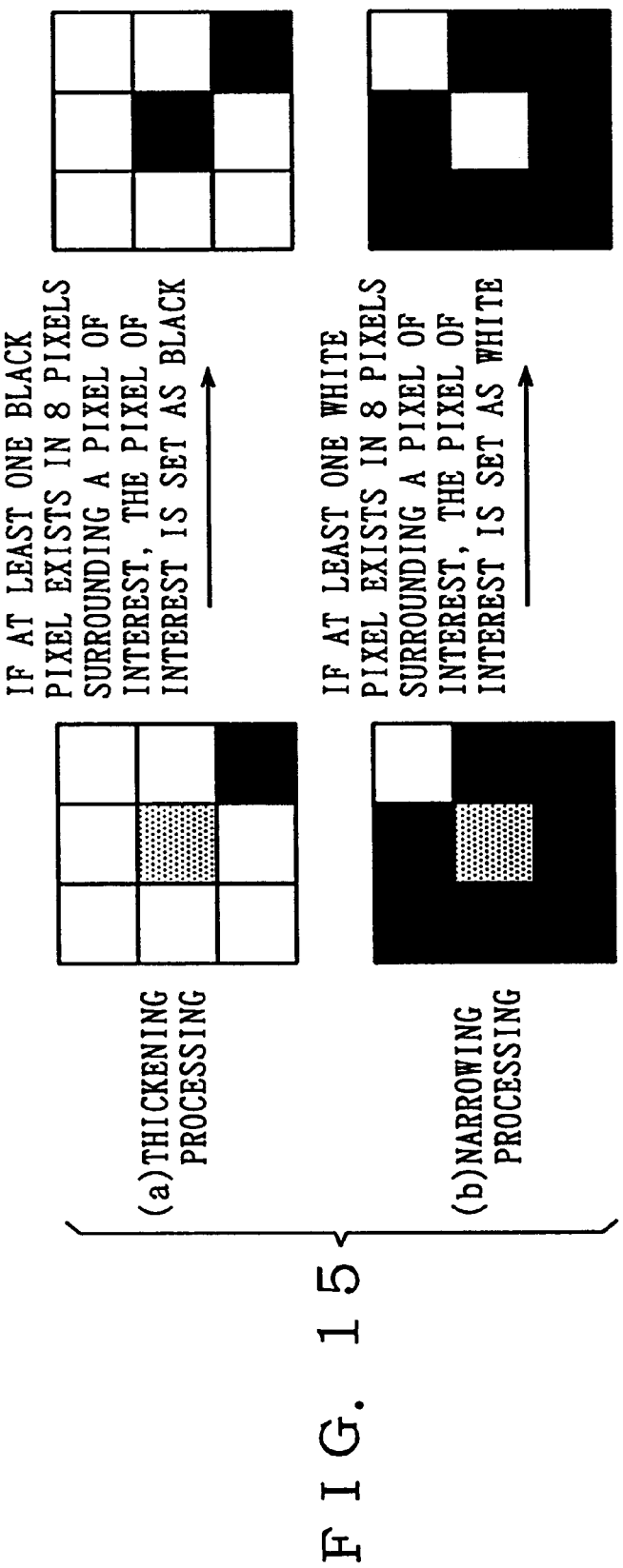
FIG. 15 is a diagram for use in illustration of a closing processing.

Now, referring to FIG. 15, the closing processing will be detailed.

During the closing processing, if there is at least one black pixel among 3×3 pixels around a pixel of interest (the pixel hatched in FIG. 15), a pixel of interest is processed as a black pixel (thickening processing), and then if there is at least one white pixel among 3×3 pixels, a pixel of interest is processed as a white pixel (narrowing processing).

Thus, the line defining the contour of the closed loop will have no disconnected part, and the contour can be accurately determined when the inside the loop is colored.

Figure 16:
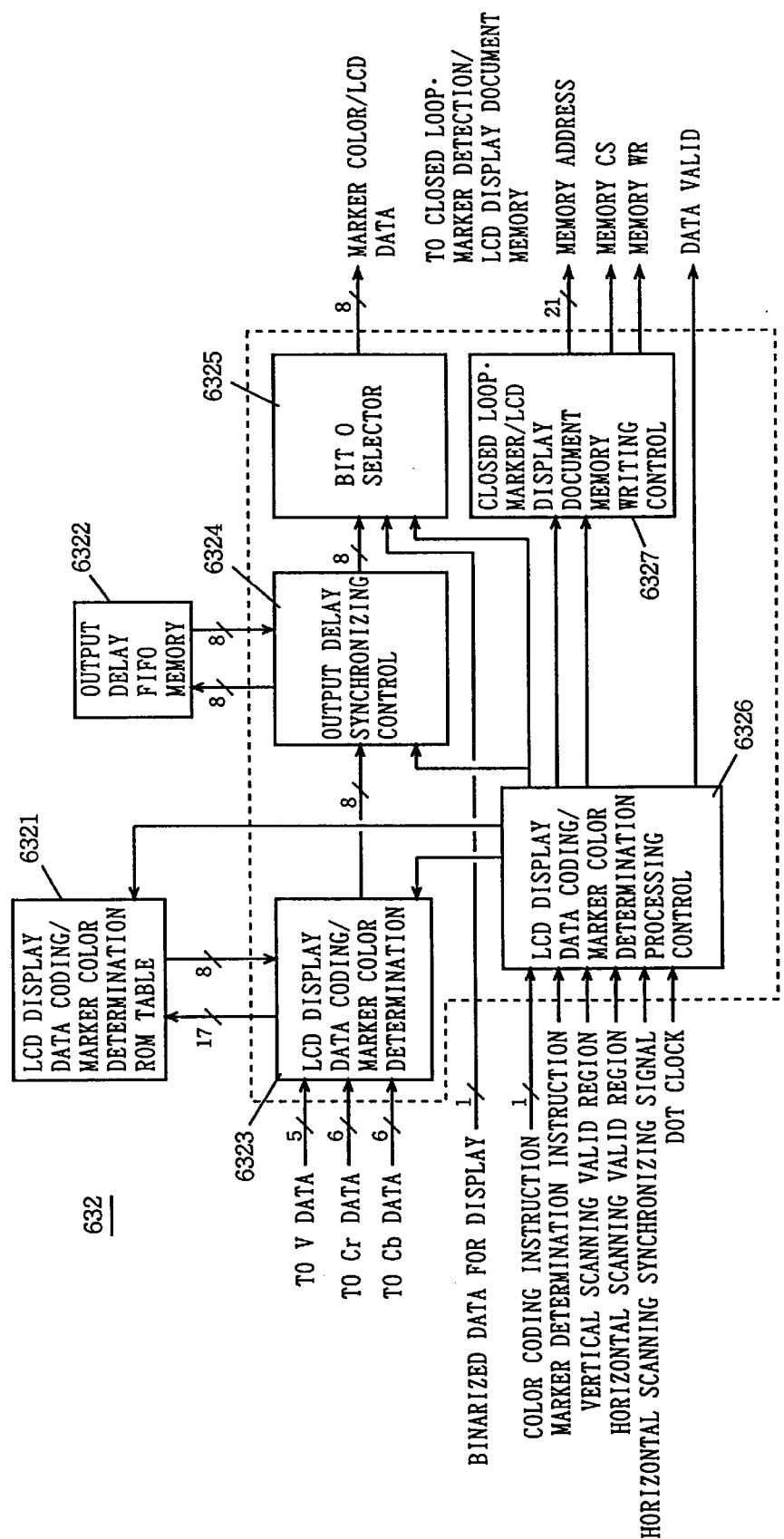
FIG. 16 is a block diagram showing the configuration of an LCD display color coding/marker color determination processing portion 632.

FIG. 16 is a block diagram showing in detail the configuration of LCD display color coding/marker color determination processing portion 632.

The processing portion converts input color document image data into color codes for display on the LCD in the color document editing mode.

In the black-and-white document editing mode, the processing portion divides the data produced by thinning the document input data into six kinds of color data (R, G, B, C, Y, M).

Data after 3×3-dot closing processing is used as black data.

The processing portion thins document information at ¼ in the vertical scanning direction, the document image will be stored in the LCD display document memory/closed loop dot marker detection memory for each 4 lines.

Referring to FIG. 16, processing portion 632 includes a determination portion 6323 for LCD display data coding/ marker color determination based on input image data, an LCD display data coding/marker color determination processing control portion 6326 for controlling the determination, an output delay synchronizing control portion 6324, a bit 0 selector 6325 to output marker color/LCD display data, a closed loop marker LCD display document memory writing control portion 6327, an ROM table 6321 for LCD display data coding/marker color determination, and an output delay FIFO memory 6322.

Now, a method of determining a marker color and a method of color coding a document will be described.

A marker color is determined by referring to the ROM table using input image data of V, Cr, and Cb thinned at ¼ as ROM addresses. Black-and-white binary data is produced by thinning binary data for display output from the binarizing processing portion at ¼ and output in synchronization with marker color determination data.

Document color coding is performed by referring to the ROM table using input image data of Y, Cr and Cb thinned at ¼ as ROM addresses.

Now, the procedure of operating the copying machine shown in FIG. 1 will be described.

Figure 17:
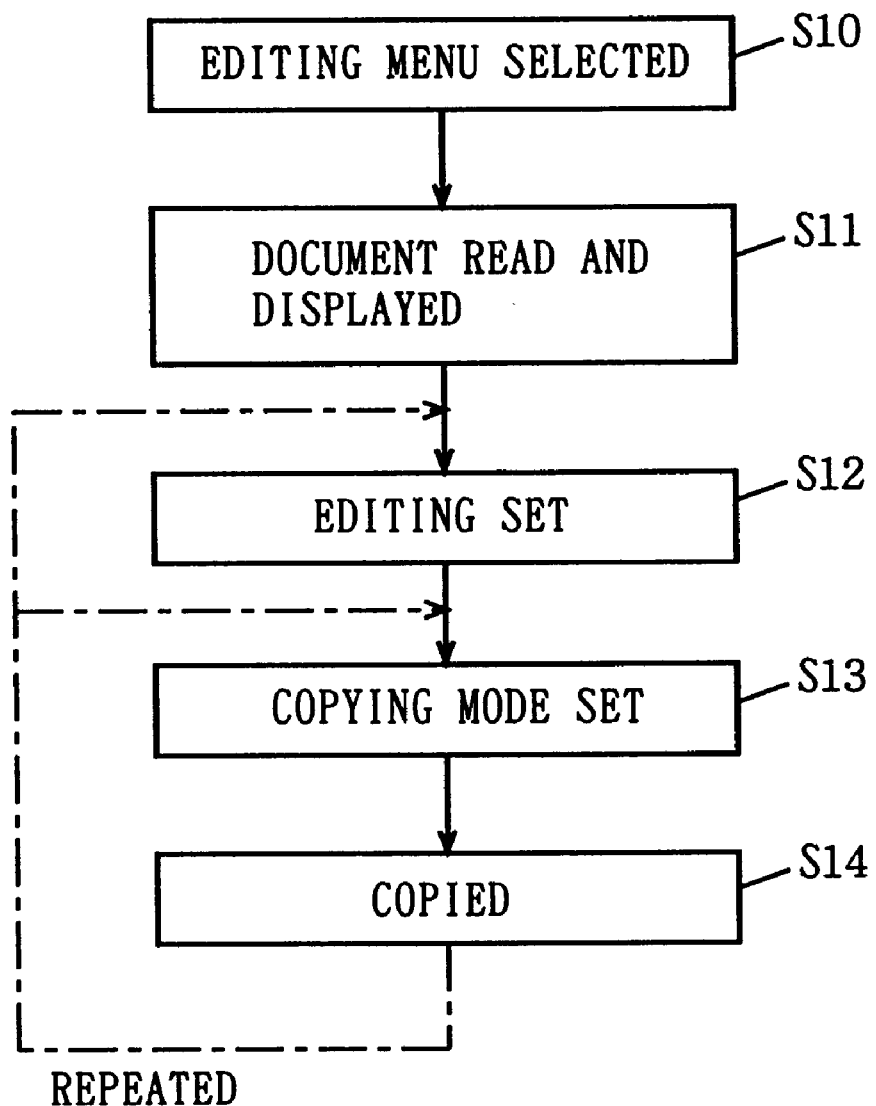
FIG. 17 is a flow chart for use in illustration of the procedure of operating the copying machine shown in FIG. 1.

FIG. 17 is a flow chart for use in illustration of the procedure of operating the copying machine.

Referring to FIG. 17, the operator selects a desired menu among display editing menus (S10). Based on the content of the selected menu, a document is read and the read content is displayed on the screen editor (S11). The operator sets an editing content through the screen editor by viewing the content of the document displayed (S12). Then, a copy mode including the sheet size, the magnification and number of copies is set (S13). Then, an edited copy is output (S14).

Figure 18:
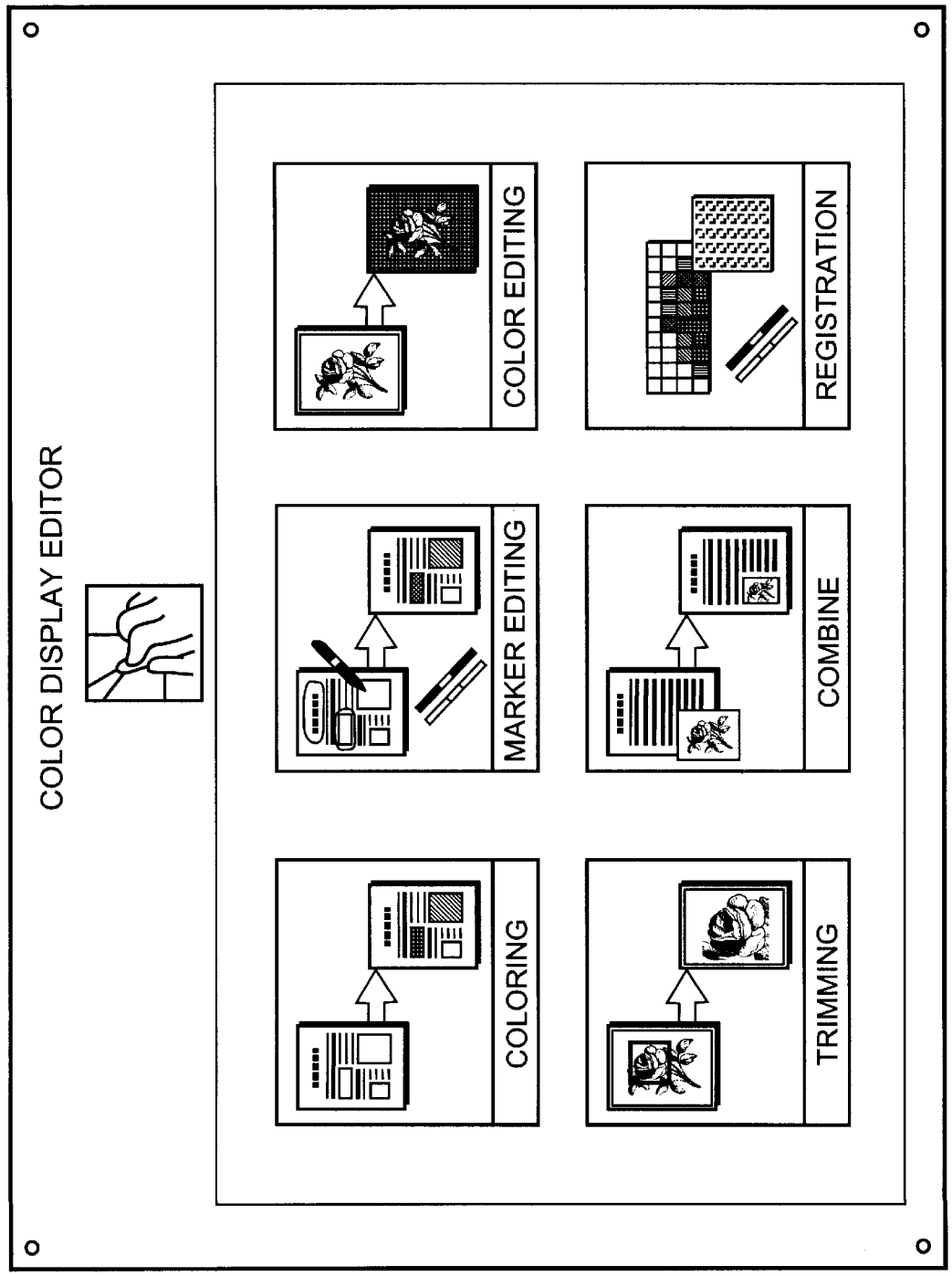
FIG. 18 shows an example of an editing menu.

FIG. 18 is a view showing examples of editing menus. The content shown in FIG. 18 are displayed on the LCD.

The menus include five purpose-specific editing menus, and a single registration menu.

In the coloring editing, characters or the base in a black-and-white document are colored.

In the marker editing, in a black-and-white document having an area designated by the marker pen, the area is colored.

In color editing, in a color document, various color editing processings such as color conversion, monochrome/color filtering are performed. The black-and-white portion of the color document may be colored.

In the trimming editing, part of a color or black-and-white document may be trimmed.

In the combining editing, a color document may be fit in a black-and-white document. In this editing, a black-and-white-document may be colored.

The registration refers to registration of a color palette or patterns as will be described.

Figure 19:
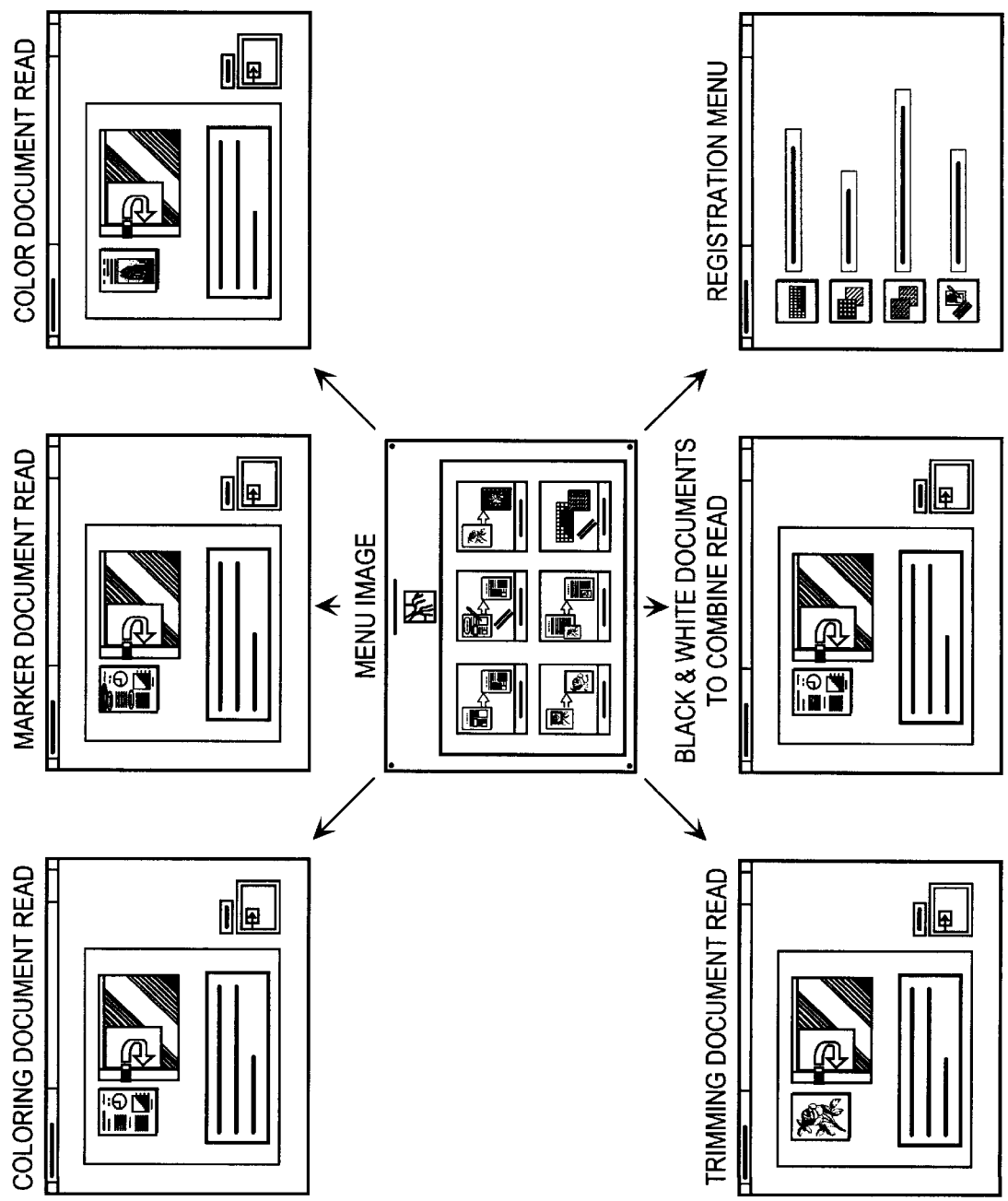
FIG. 19 shows images displayed when an operator presses the buttons in the editing menu.

The user can select a desired editing menu among them through the touch panel. Once a menu is selected, an image corresponding to each content will be displayed as shown in FIG. 19.

Figure 20:
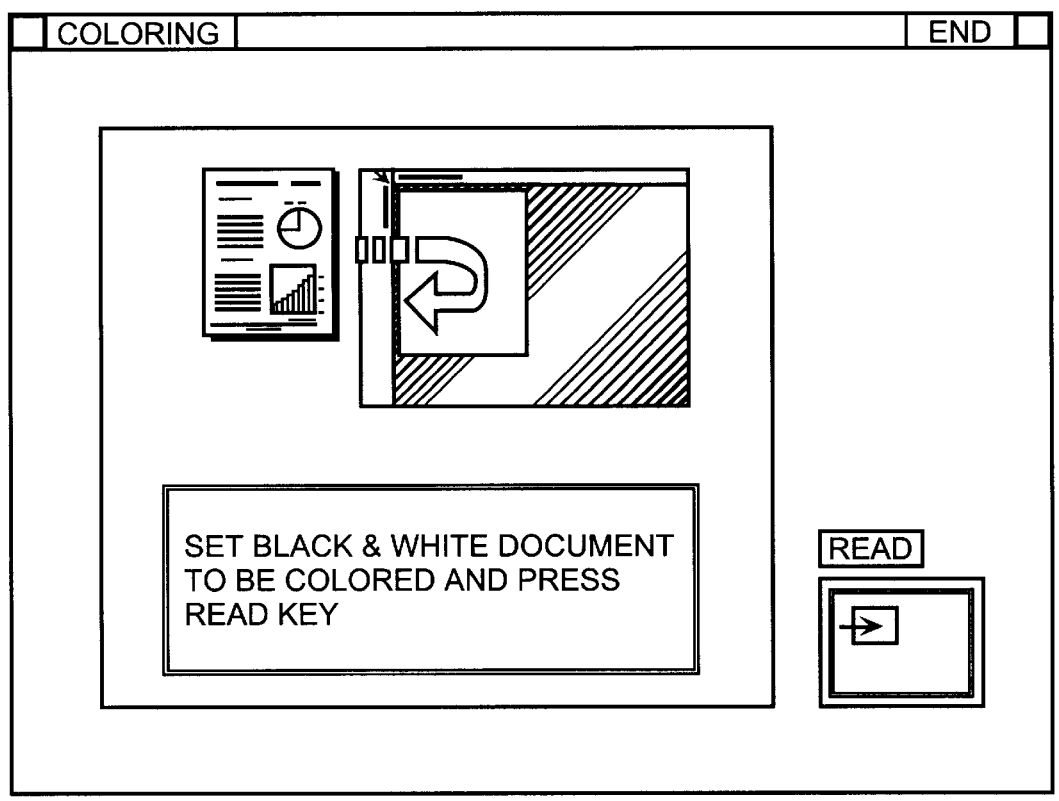
FIG. 20 shows an image displayed when a coloring mode is selected.
Figure 21:
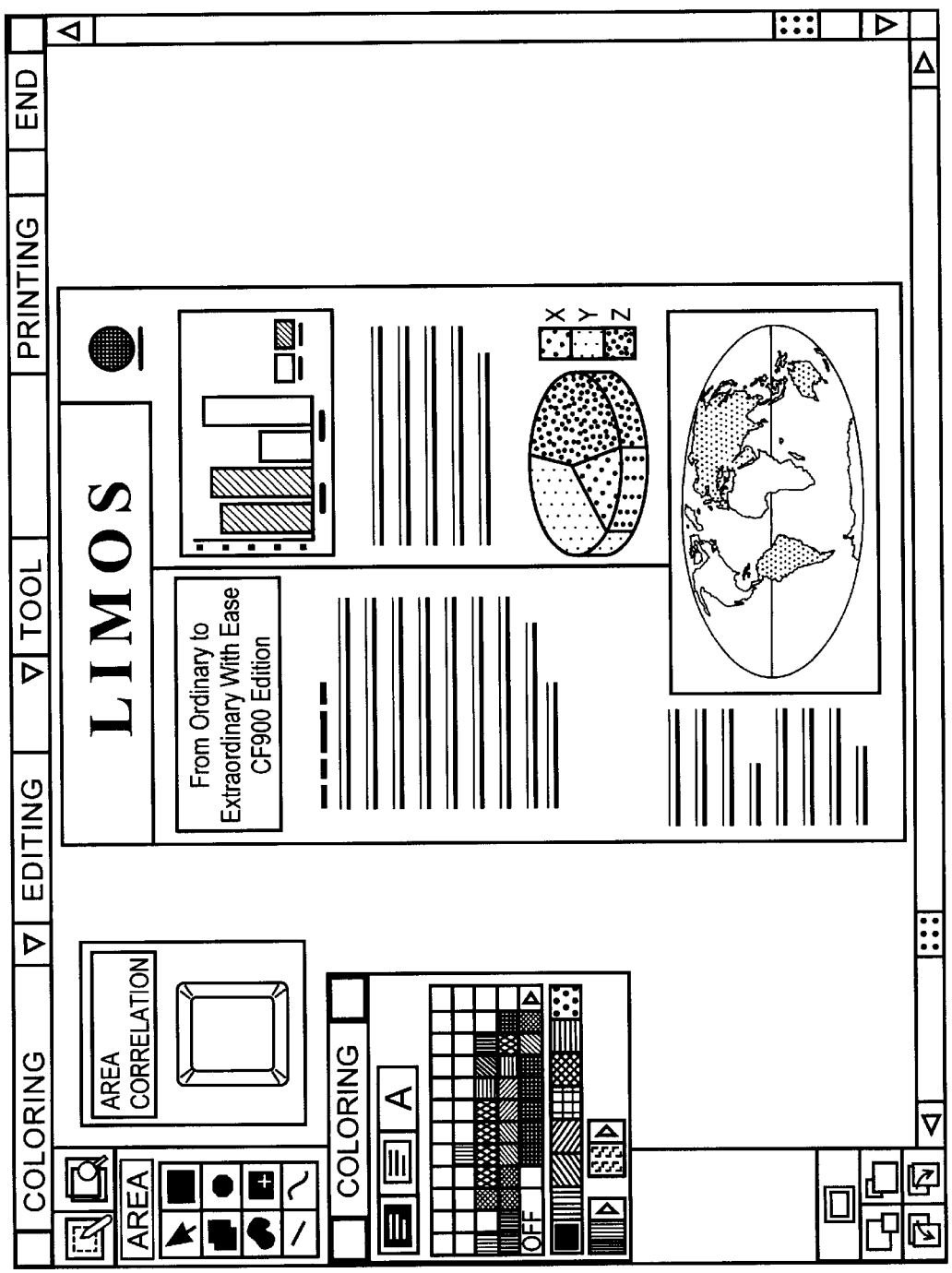
FIG. 21 shows an image displayed during the processing of coloring a black-and-white document.

Now, an image when the coloring editing is selected is shown in FIG. 20. The user sets a black-and-white document to be colored according to the displayed message and presses a read key (lower right in the image). Then, the black-and-white document is read, and the image of the document is displayed on the LCD. In the state, the displayed document image is colored through the touch panel as shown in FIG. 21, and a colored copy is output from the printer.

Figure 22:
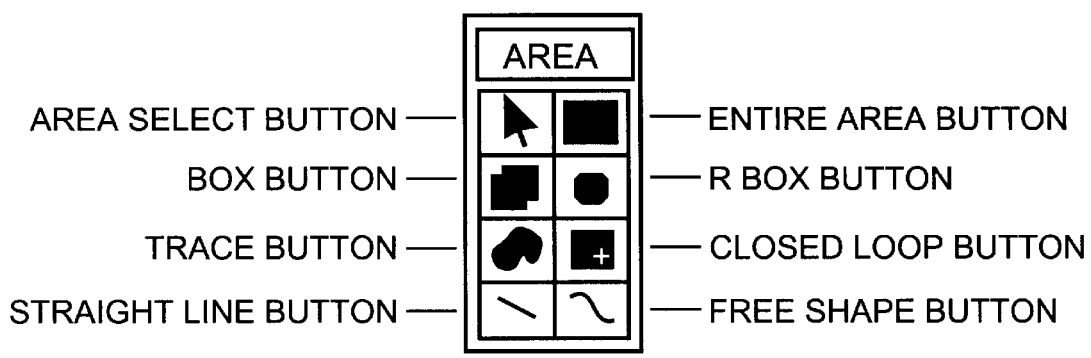
FIG. 22 shows an area designation tool.

In the coloring, an area designation tool as shown in FIG. 22 is used. The area designation tool includes an area select button to select a designated area, an entire document button for the entire document, a box button to designate a rectangular area, an R box button to designate a round rectangular area, a trace button to designate an area in a desired shape, a close loop button to designate an area in a closed loop, a linear button to draw a straight line, and a free shape button to draw a desired shape.

Herein, the box button is a button to designate a rectangle as an area to be colored and the rectangle is defined by two points, the starting point and ending point by dragging the pen.

Figure 23:
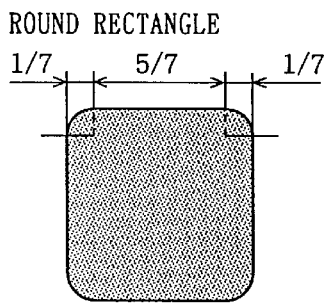
FIG. 23 shows the shape of an R box.

The R box is a button to designate a square with its corners rounded off which is defined by two points, the starting point and ending point by dragging the pen. The round rectangle is shown in FIG. 23.

Figure 24:
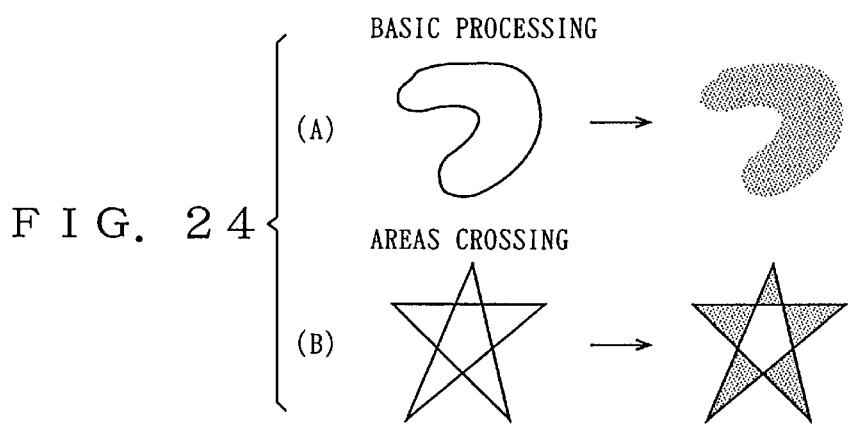
FIG. 24 shows processings by the trace button.

The trace button is a button to designate a closed free shape area with the starting point and ending point designated by dragging the pen. As a basic processing in the area designation by the trace button as shown in FIG. 24 at (A), an area surrounded by a trace line is extracted as a target area. If areas cross each other as shown in FIG. 24 at (A), the crossing area is extracted as a target area. In FIG. 24, the hatched region corresponds to a target area for processing.

Figure 25:
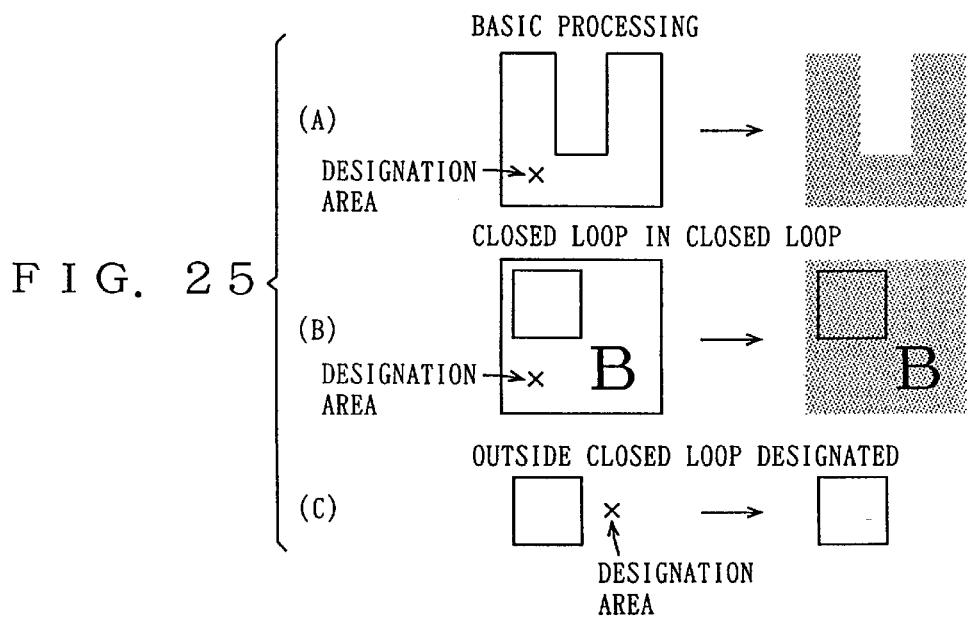
FIG. 25 shows processings by the closed loop button.

The closed loop button is a button to designate an area closed in a black frame around the position input by the pen as a target area. The closed loop area processing proceeds as shown in FIG. 25.

More specifically, as a basic processing, the area surrounded by the black frame is extracted as a closed loop area (FIG. 25(A)). If there is another closed loop in a closed loop, the area surrounded by the outer black frame is extracted as a closed loop area (FIG. 25(B)). The inner closed loop area is not recognized. Thus, closed loops present in alphabet "B" for example is not identified.

If a portion outside the closed loop is designated, the area is not recognized as a closed loop area (FIG. 25(C)).

Figure 26:
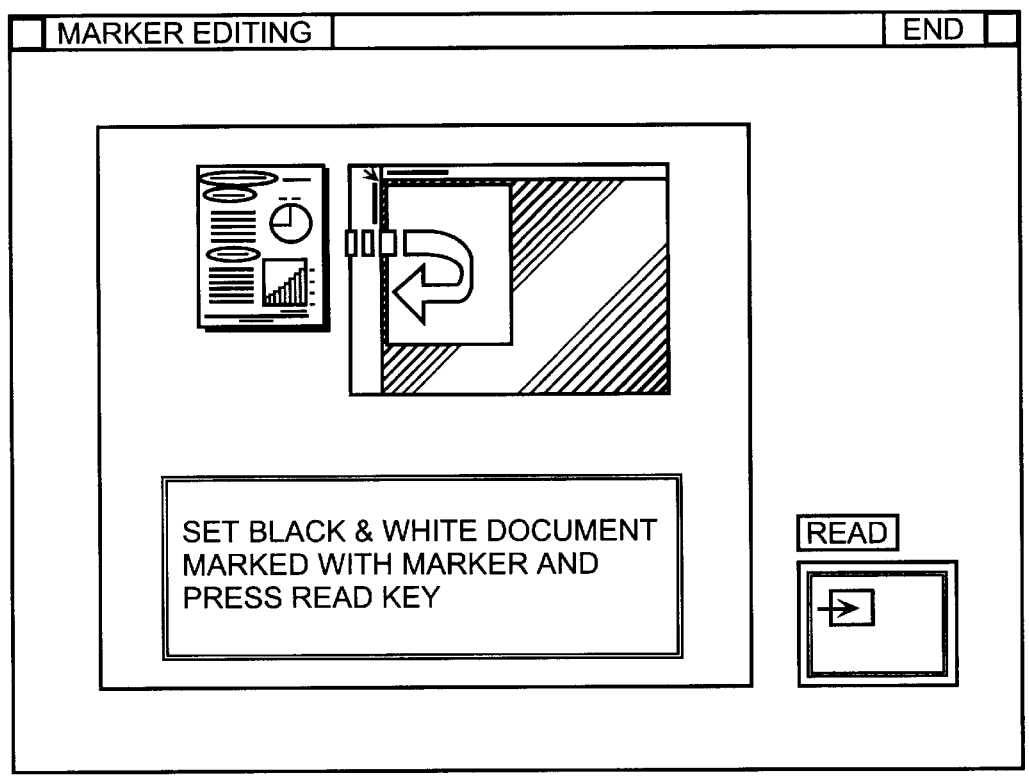
FIG. 26 shows an image displayed in a marker editing mode.

FIG. 26 shows an image when the marker editing mode is designated.

Figure 27:
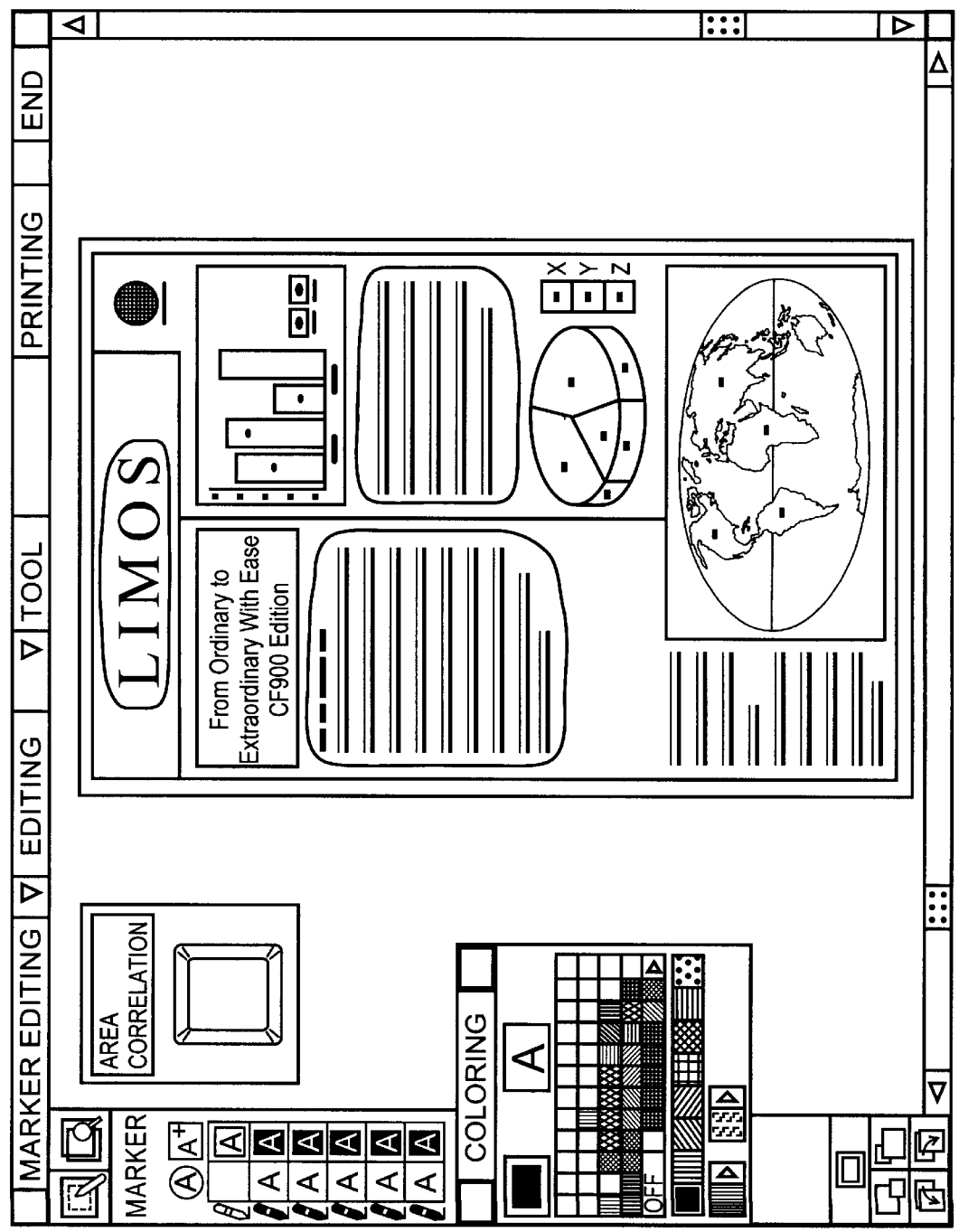
FIG. 27 is an image displayed during marker editing.

Referring to FIG. 26, the operator sets a marker-processed black-and-white document to IR, presses the read key according to the displayed content shown in FIG. 26, and the marker document is read. The read marker document is displayed on the LCD as shown in FIG. 27. The marker designation is made by designating an area desired to be edited with a marker (surrounding frame designation) or by designating an area within a closed loop by marking dots with a marker within a closed loop of the document (dot designation).

Figure 28:
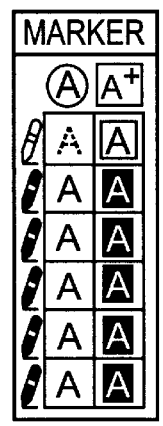
FIG. 28 shows a marker area designation tool.

A further marker area may be designated to a document displayed on the LCD, in which case the marker area designation tool shown in FIG. 28 is used. The marker area designation tool can designate yellow, magenta, cyan, green, red and blue, and the surrounding frame designation and dot designation can be made for each color.

Figure 29:
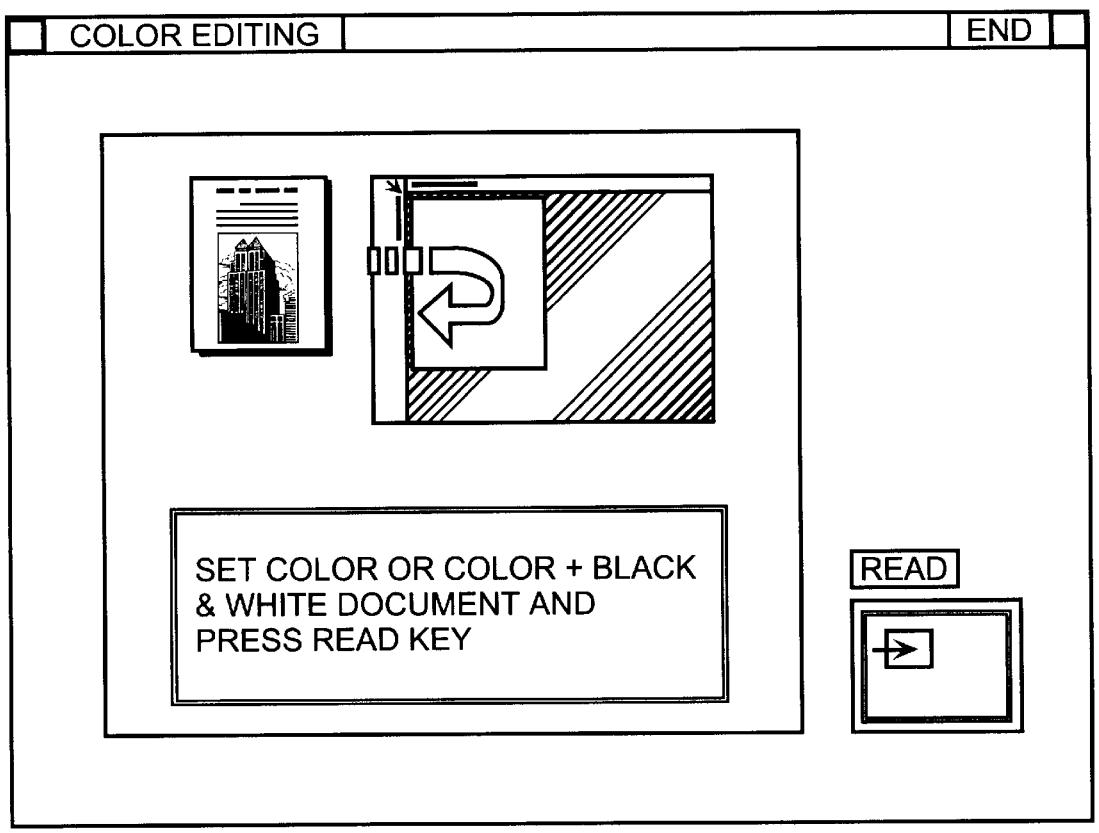
FIG. 29 is an image displayed when a color editing mode is selected.
Figure 30:
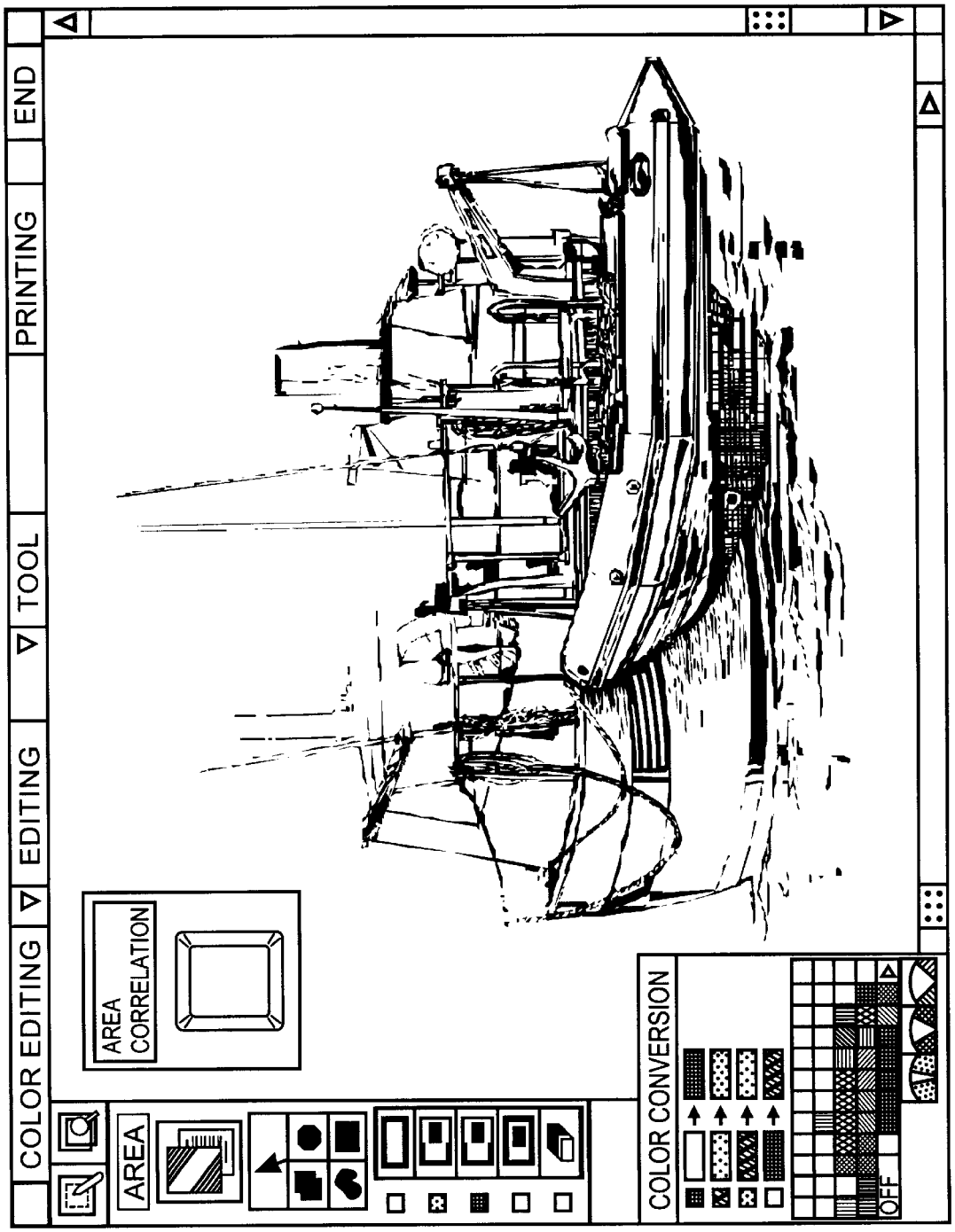
FIG. 30 shows an image read from a color document and displayed.

FIG. 29 shows an image when the color editing mode is designated. The operator sets a color document or a color+black-and-white mixture document to process at the IR according to the message displayed in the image and presses the read key. Thus, the color document is read, and displayed on the LCD as shown in FIG. 30. The user designates color conversion, for example, through the touch panel to the color document.

Figure 31:
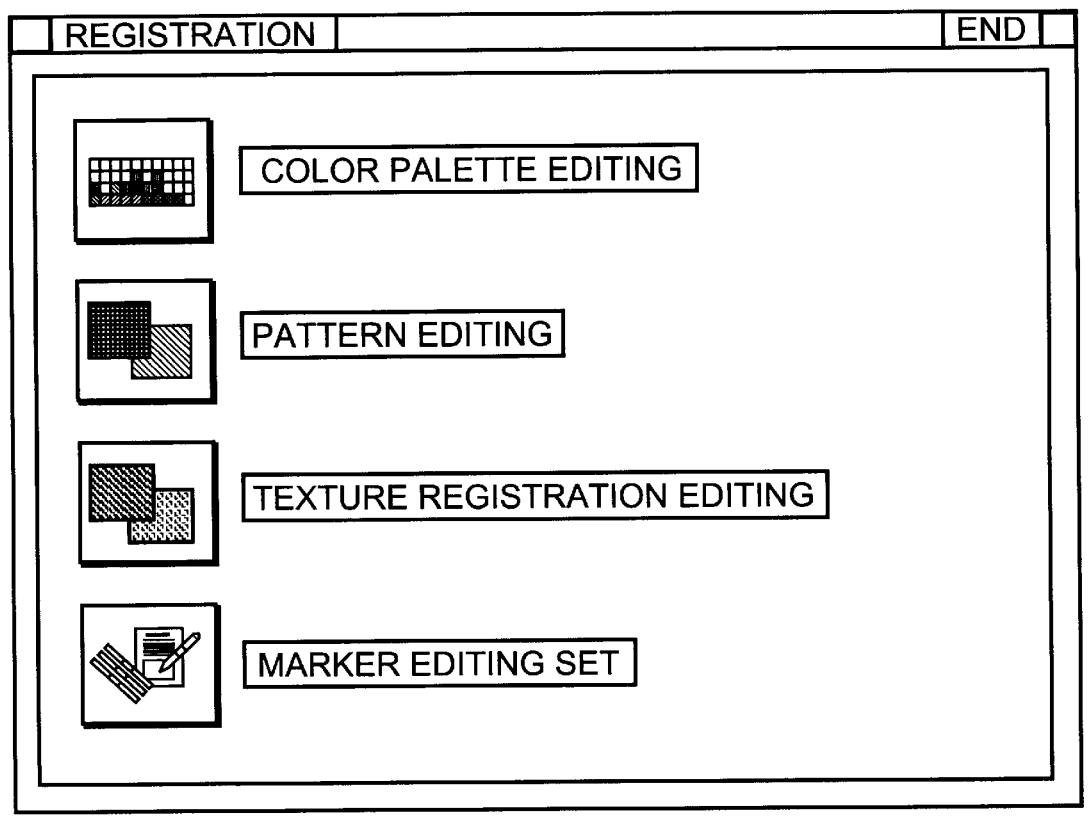
FIG. 31 shows an image displayed when a registration processing is selected.

In FIG. 18, if the registration mode is selected, the image shown in FIG. 31 is displayed on the LCD.

Figure 32:
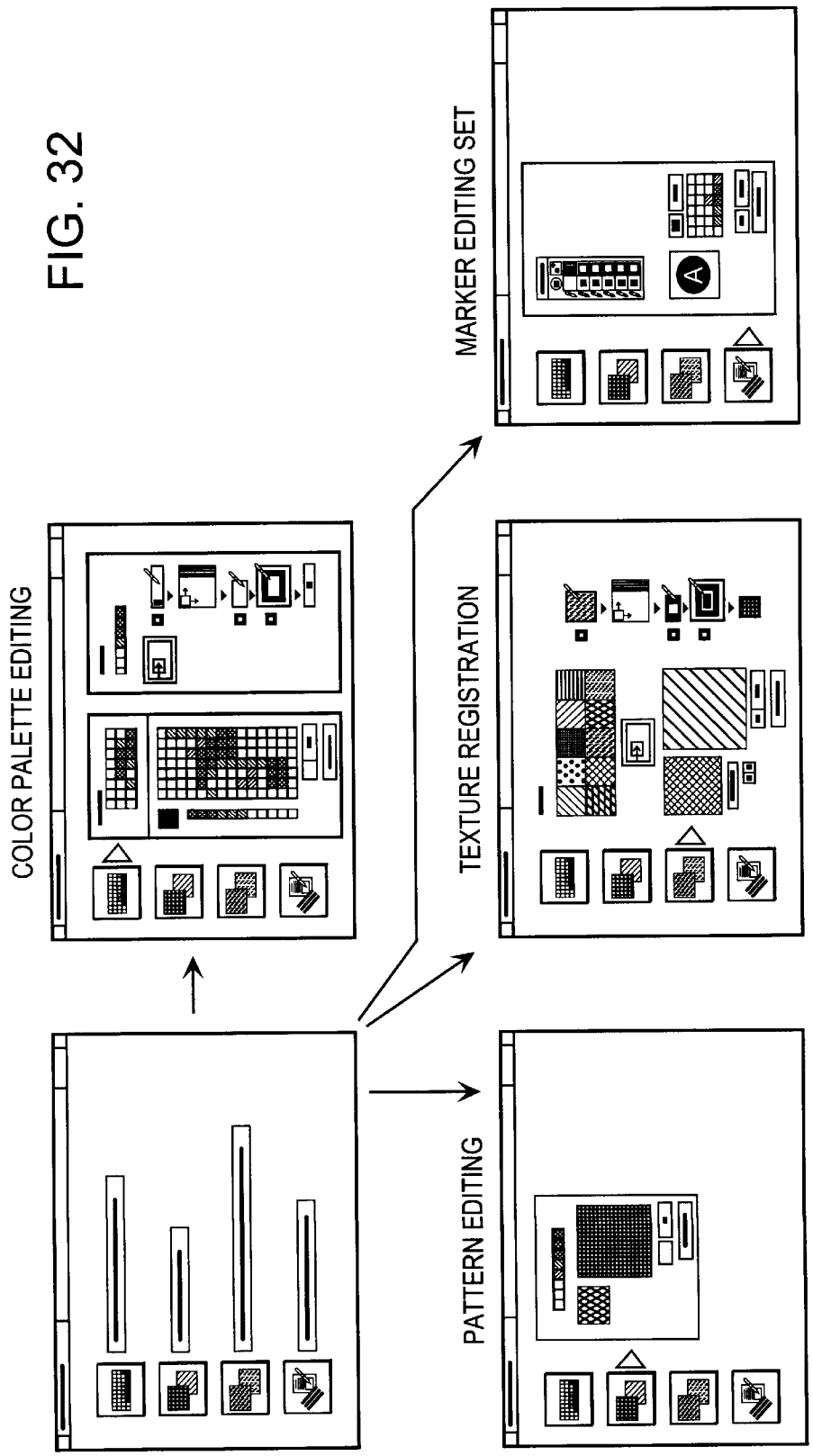
FIG. 32 shows an image displayed after the operator presses the touch panel as the image in FIG. 31 is displayed.

There are four kinds of registration menus. In the color palette editing, colors are registered, the standard color palette, and colors to register are read. In the pattern editing, the pattern editing is made for coloring the background. In the texture registration, the texture pattern is read for registration. In the marker editing setting, a standard (default) editing mode for marker editing is set. As shown in FIG. 32, an image corresponding to the content of each button pressed by the operator is displayed for registration.

Figure 33:
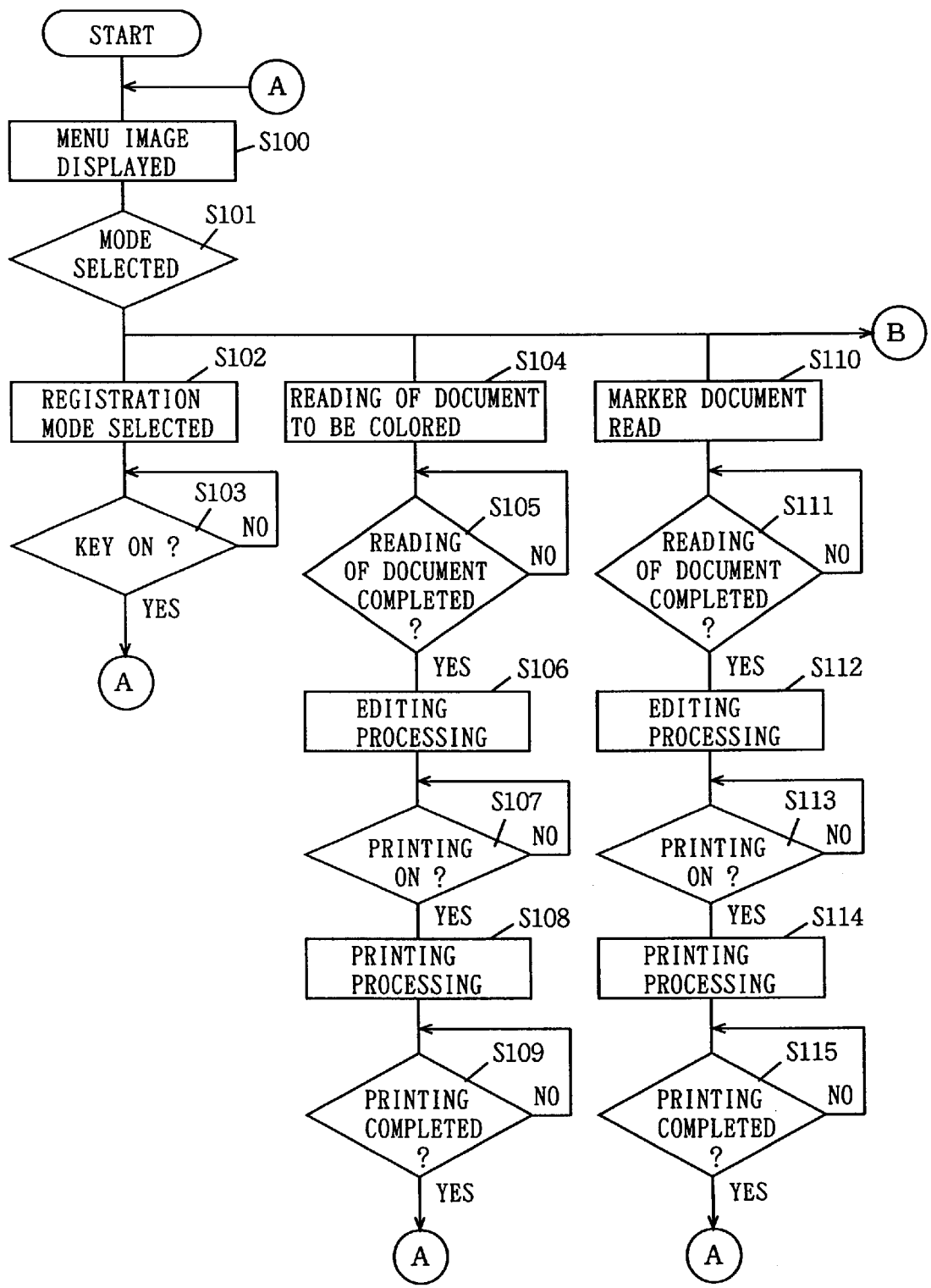
FIG. 33 is a flow chart for use in illustration of a routine of displaying images for operating the copying machine in FIG. 1.
Figure 34:
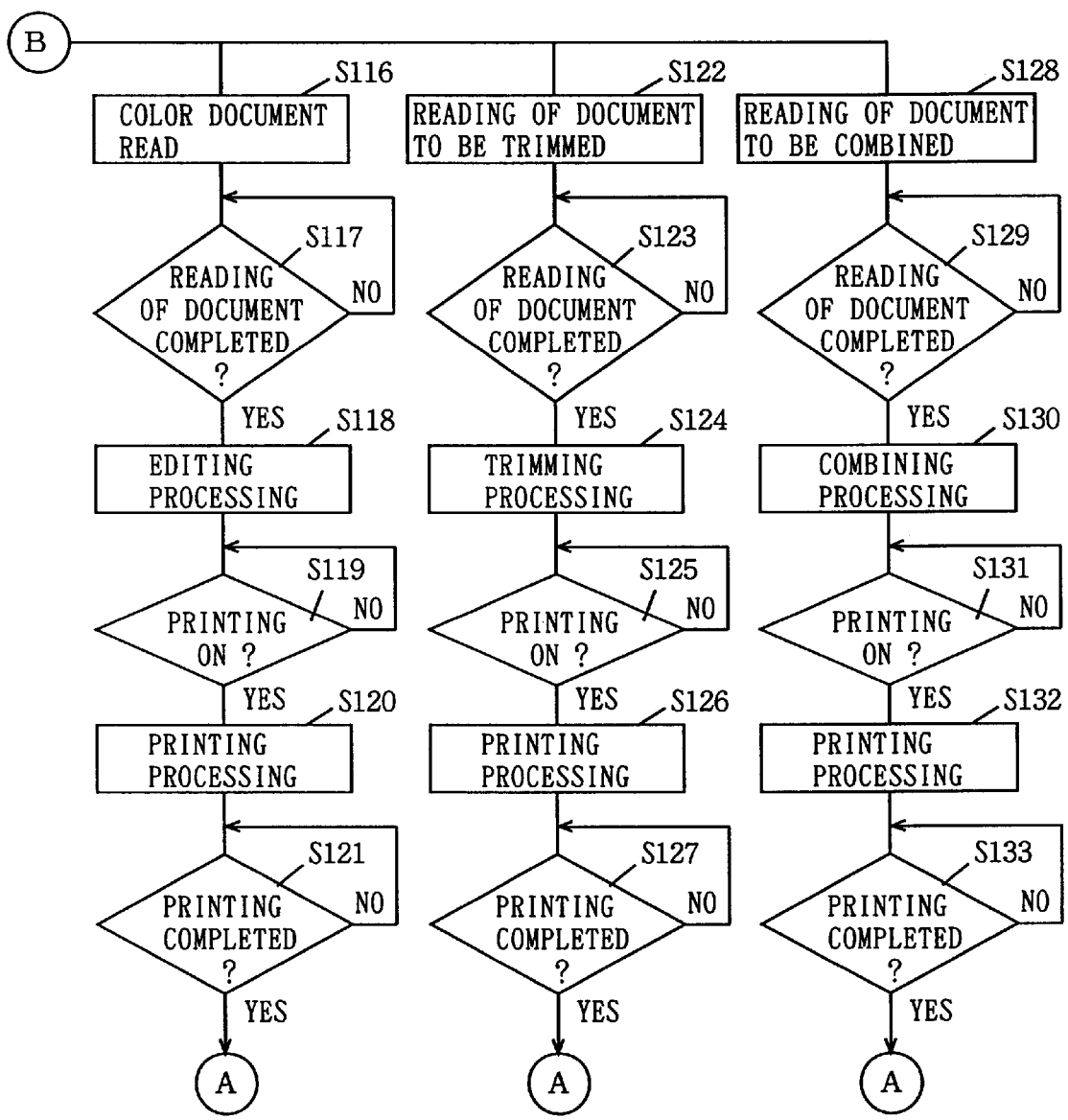
FIG. 34 is the continuation of the flow chart shown in FIG. 33.

FIG. 33 is a flow chart for use in illustration of the processing of displaying images for operating the digital color copying machine according to this embodiment. FIG. 34 is the continuation of the flow chart shown in FIG. 33.

Referring to FIG. 33, once the machine is activated, in step S100, the editing menu image shown in FIG. 18 is displayed. In step S101, the process is branched depending on a mode selected by the user.

If "registration" is selected, the registration menu as shown in FIG. 31 is displayed in step S102, and various setting images are displayed according to the user's selection for registration as shown in FIG. 32. In step S103, it is determined whether there has been a key input, and the processing from step S100 is once again executed if the answer is YES.

Meanwhile if "coloring editing" is selected, the image shown in FIG. 20 is displayed in step S104, and reading of a document to be colored is initiated. In step S105, it is determined if the reading of the document has been completed, if the answer is YES, the editing image shown in FIG. 21 is displayed in step S106, and the user performs an editing processing. After the editing processing, it is determined in step S107 if the print key has been turned on, and if the answer is YES, a printing processing is executed in step S108. It is determined in step S109 if the printing processing has been completed, and if the answer is YES, the processing from step S100 is once again executed.

In the mode selecting image, if "marker editing" is selected, the image shown in FIG. 26 is displayed in step S110, and reading of a black-and-white document processed with markers is initiated. It is determined in step S111 if the reading of the document has been completed, if the answer is YES, the editing image shown in FIG. 27 is displayed in step S112, and an editing processing by the user is performed. It is determined in step S113 if the print key has been turned on after the editing processing, and if the answer is YES, the printing processing is executed in step S114. Then, it is determined in step S115 if the printing processing has been completed, and if the answer is YES, the processing from step S100 is once again executed.

In the editing menu, if "color editing" is selected, the image shown in FIG. 29 is displayed in step S116, and a color document is to be read. It is determined in step S117 if the reading of the document has been completed, if the answer is YES, the editing image shown in FIG. 30 is displayed in step S118, and an editing processing corresponding to the input by the user is executed. It is determined in step S119 if the print key has been turned on after the editing processing, and if the answer is YES, a printing processing is executed in step S120. It is determined in step S121 if the printing processing has been completed, and if the answer is YES, the processing from step S100 is once again executed.

In the editing menu, if "trimming" is selected, a document to be trimmed is read in step S122. It is determined in step S123 if the reading of the document has been completed, and if the answer is YES, a trimming processing corresponding to the input by the user is executed in step S124.

It is then determined in step S125 if the print key has been turned on, and if the answer is YES, the printing processing is executed in step S126. It is determined in step S127 if the printing processing has been determined, and if the answer is YES, the processing from step S100 is once again executed.

In the editing menu, if "combining" is selected, documents to be combined are read in step S128. It is then determined in step S129 if the reading of the documents has been completed, and if the answer is YES, a combining processing corresponding to the input by the user is executed in step S130.

It is then in step S 131 if the print key has been turned on, and if the answer is YES, the printing processing is executed in step S132. It is determined if the printing processing has been completed in step S133, and if the answer is YES, the processing from step S100 is again performed.

Figure 35:
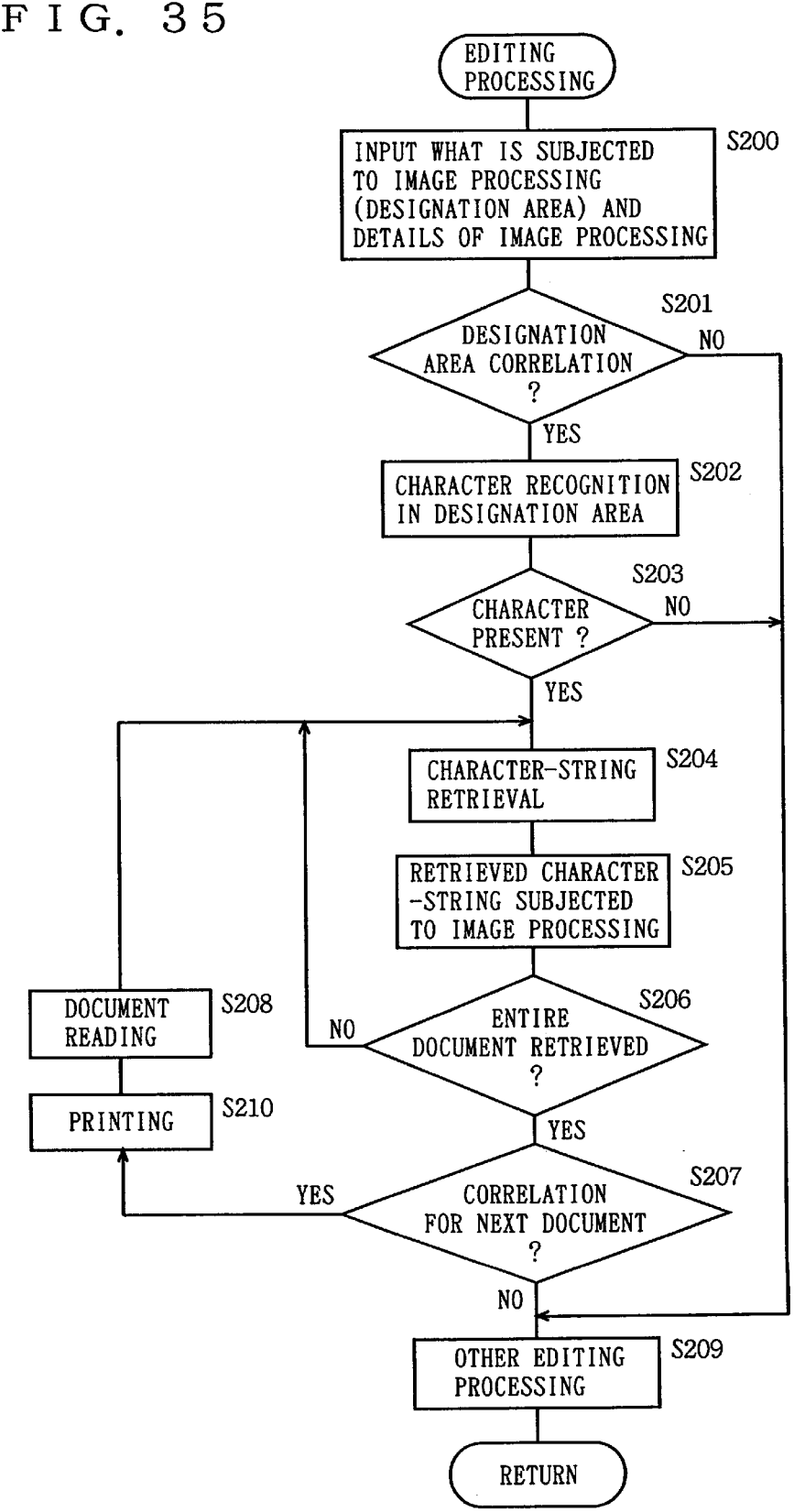
FIG. 35 is a flow chart for editing processing shown in FIGS. 33 and 34.

FIG. 35 is a flow chart showing processing in editing processing shown in FIGS. 33 and 34 (S106, S112, S118).

Referring to FIG. 35, in step S200, what is subjected to image processing (edit processing) (designation area), and details of the image processing applied to the designation area are input. For "coloring editing," the designation area is input by the area designation tool shown in FIG. 22, and for "marker editing," the designation area is entered in a document with a marker or input to a document displayed on the LCD with the marker area designation tool shown in FIG. 28. For "color editing," the designation area is input to a document displayed on the LCD as shown in FIG. 30.

In "coloring editing," the image processing applied to the designation area refers to a process of coloring characters or graphics in the designation area or a process of coloring the background of the characters or graphics. In "marker editing," the image processing refers to a process corresponding to the color of the marker (coloring, reduction of an image, erasing of an image). In "color editing," the image processing refers to a process of converting a color of an image in the designation area.

Figure 36:
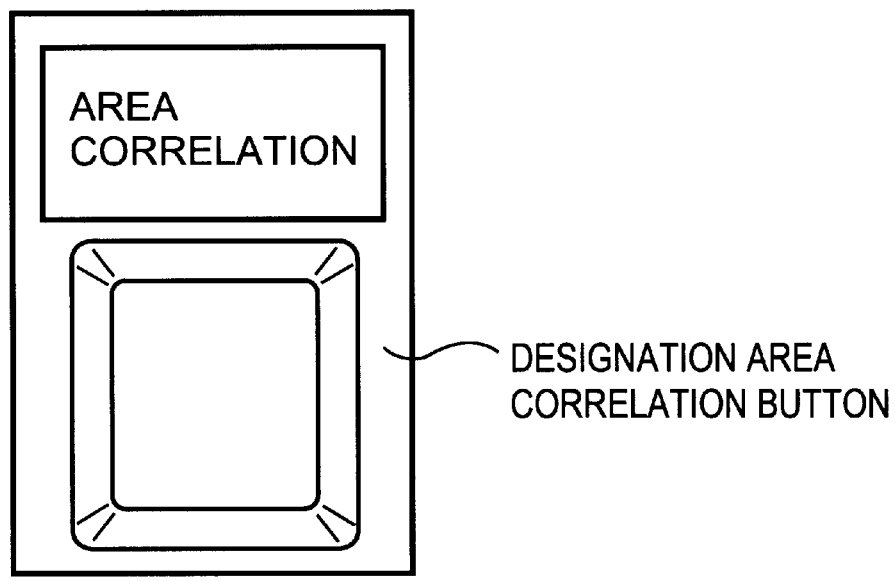
FIG. 36 shows a designation area correlation tool.

Next, in step S201, it is determined if a designation area correlation button is turned on or not. The designation area correlation button is included in the designation area correlation tool shown in FIG. 36. The designation area correlation tool is displayed on the LCD as shown in FIGS. 21, 27 and 30, and may be switched on/off by being pressed.

If the answer is YES in step S201 of FIG. 35, any character in the designation area is recognized in step S202, and character-string data is stored in work RAM 606 if there is any character. In step S203, it is determined if there is any character in the designation area. If the answer is YES, a character which is the same as the character in the designation area is retrieved from an image stored in LCD display document/closed loop•marker detection memory 620.

In step S205, retrieved character-string is subjected to image processing. Specifically, the position of the character which is the same as the character in the designation area is subjected to the image processing by writing data of "1" into editing area designation memory 626.

In step S206, it is determined if all characters in the document are retrieved. If the answer is YES, it is determined if correlation is applied to the next document in step S207. This determination may be made by selection by a user or by initial setting of the copying machine.

If the answer is NO in step 207, other editing processes are executed in step S209 and the processing is returned.

If the answer is YES in step S207, an image which has been subjected to the image processing is printed in step S210, next document is read in step S208, and the processing is executed from step S204.

If the answer is NO in step S206, the processing from step S204 is again performed.

If the answer is NO in step S201 or step S203, the processing is executed from step S209.

Figure 37:
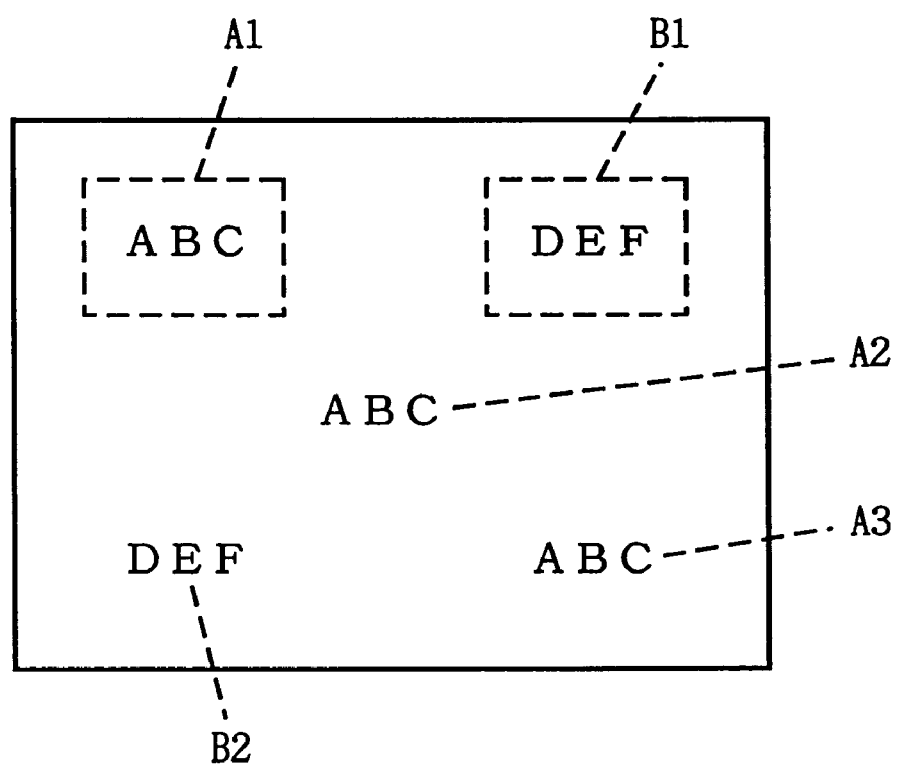
FIG. 37 is provided for describing an effect of the copying machine of FIG. 1.

FIG. 37 is provided for describing processing performed in the flow chart shown in FIG. 35. Referring to FIG. 37, suppose that a user inputs an image processing by designating characters of ABC contained in an image as a designation area Al, and designating coloring of the characters with red. If the designation area correlation button is turned on, all of the other characters of ABC (A2, A3) present in the image are colored with red.

Similarly, if an image processing is input by designating characters DEF as a designation area B1 and designating coloring of the characters with blue, the other characters of DEF (B2), are also colored with blue.

Accordingly, a user can apply the same image processing to all of the same characters other than designated ones by designating one area, even if the user does not designate all of the areas of A1–A3 as well as B1 and B2.

(Modification 1)

Figure 38:
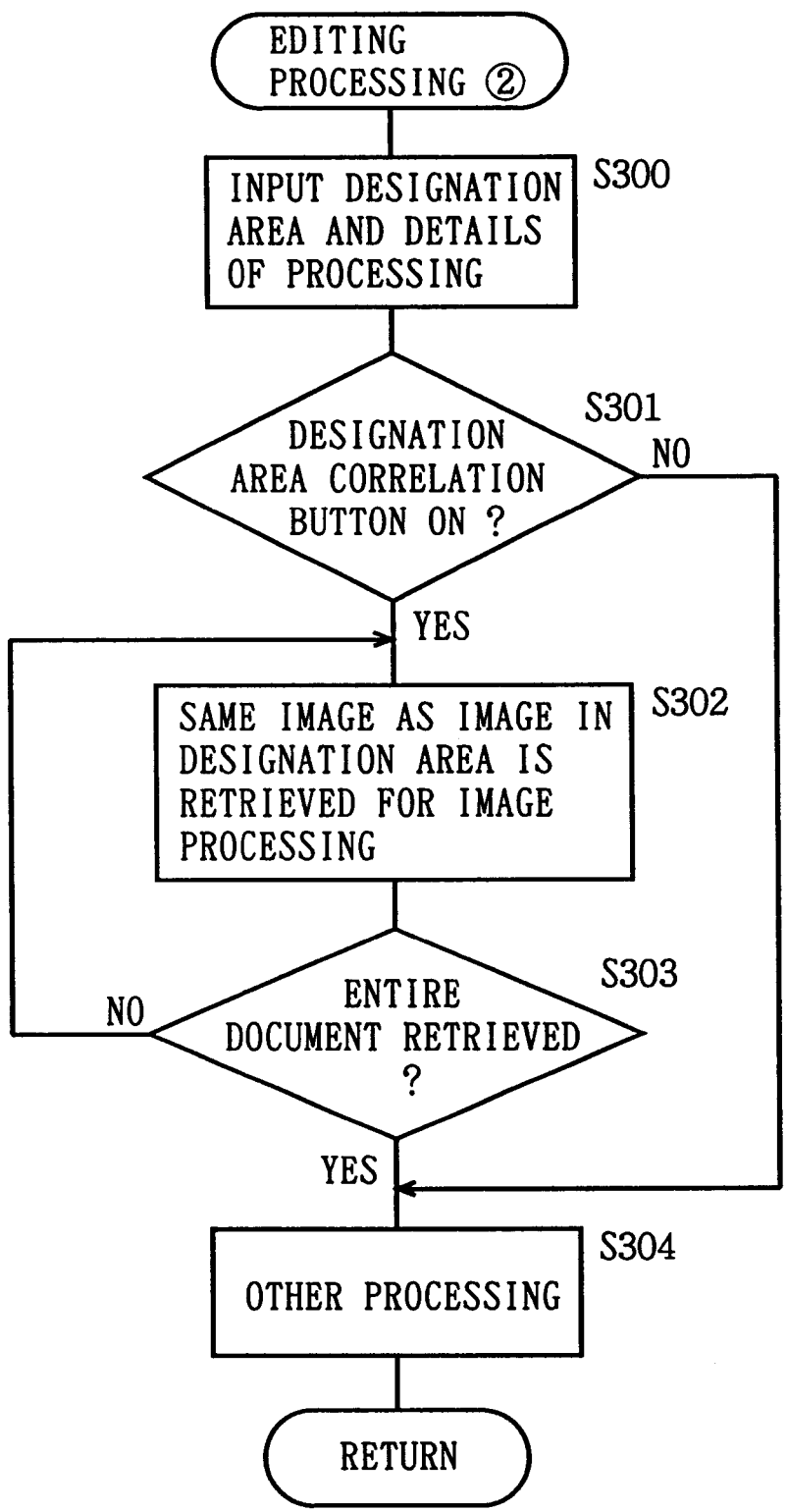
FIG. 38 is a flow chart showing a modification of the flow chart of FIG. 35.

The processing shown in the flow chart of FIG. 38 may be executed instead of the flow chart shown in FIG. 35. Following the flow chart of FIG. 38, correlation of an area is executed for not only a character in a designation area but an image other than characters.

Referring to FIG. 38, in step S300, a designation area and details of image processing are input. In step S301, it is determined if the designation area correlation button is turned on or not. If the answer is YES, any image which is the same as the image in the designation area is retrieved and the retrieved one is subjected to the image processing in step S302.

In step S303, it is determined if the retrieving is performed for the entire document. If the answer is YES, other processes are executed in step S304 and the processing is returned.

If the answer is NO in step S303, the processing is executed from step S302 again. If the answer is NO in step 301, the processing is executed from step S304.

Figure 39:
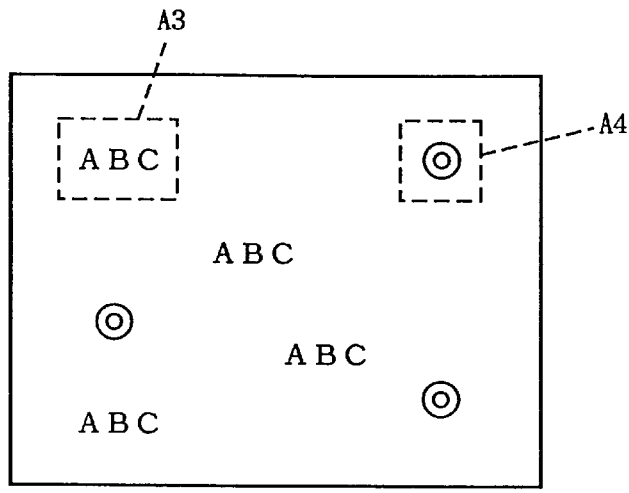
FIG. 39 is provided for describing an effect obtained by the flow chart of FIG. 38.

Following the flow chart shown in FIG. 38, correlation is applied not only to any character in a designation area but to any other image. Thus a user can designate an area A4 including an image other than characters in addition to the area A3 including characters of ABC as a designation area as shown in FIG. 39. Therefore, if there is any other image which is the same as the image included in area A4, the image outside the area A4 can be subjected to the same image processing.

Although an image which is the same as the image included in a designation area is retrieved according to this modification, a similar image, an image relating to the image in the designation area, or the like may be retrieved.

(Modification 2)

According to the embodiments above, description is given of a copying machine by which a read document is displayed on an LCD and a designation area for image processing and details of the image processing can be input based on details displayed thereon. However, the present invention can be applied to a copying machine by which details of a read document are not displayed on an LCD.

Figure 40:
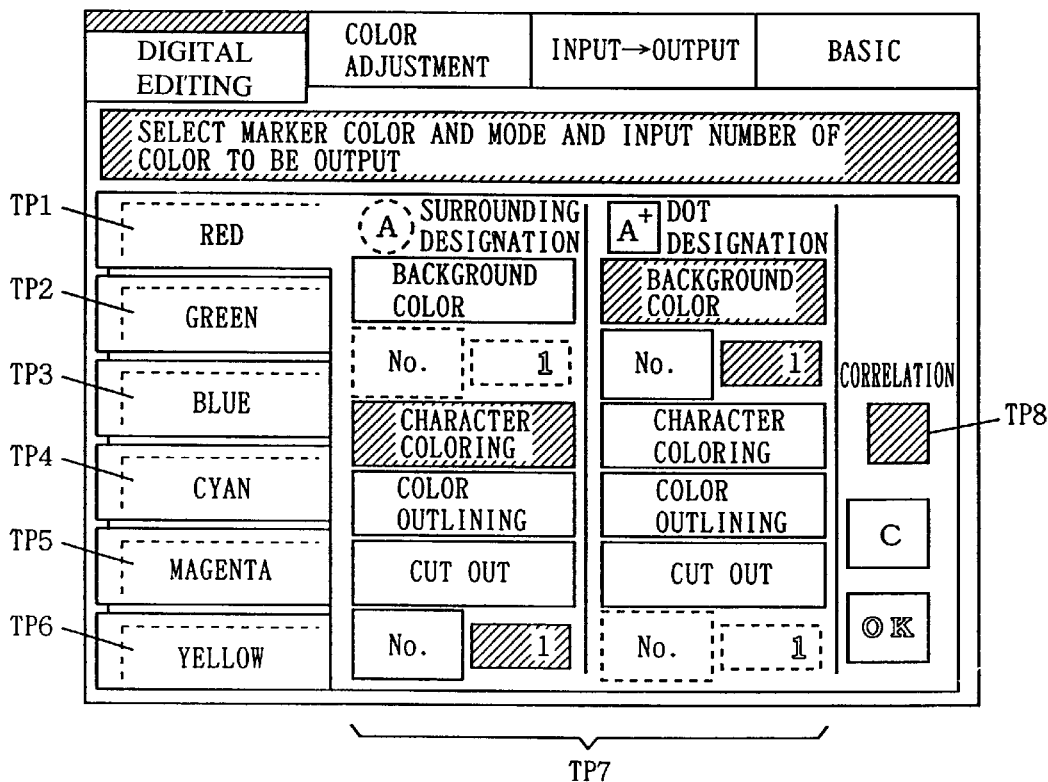
FIG. 40 shows an LCD of another copying machine to which the present invention is applied.

FIG. 40 shows an LCD on which an image for operation of a copying machine is displayed. For the copying machine, a user can set an area which is subjected to image processing (designation area) and details of the image processing by enclosing a desired region in a document with a marker or by marking dots in a closed loop included in a document with a marker. When the copying machine reads such a document, the read image is subjected to image processing in the copying machine without displayed on the LCD, and an image to which the image processing has been applied is printed.

A user can set the color of a marker and details of image processing corresponding to the color using the image shown in FIG. 40.

Specifically, referring to FIG. 40, buttons TP1–TP6 for designating the color of a marker, a tool TP7 for setting details of image processing corresponding to the designated color of the marker, and a designation area correlation button TP8 are displayed on the LCD.

Marker color designation buttons TP1–TP6 respectively correspond to colors of the marker, red, green, blue, cyan, magenta and yellow. A user can set details of image processing to be executed in the area surrounded by the marker, and details of image processing executed in the closed loop marked by the dots of the marker, using designation marker color setting tool TP7. Specifically, the user can set, as details of image processing, application of a background color into the designation area, coloring of characters, outlining with color, or erasing of a portion within the outline (cutout).

Here, the designation area correlation button TP8 has an effect similar to that of the embodiment described above. Specifically, an image which relates to an image included in a designation area (the same image or any similar image) is retrieved, and image processing which is similar to that applied to the image in the designation area is performed for the retrieved image.

In the case of such a copying machine, if a user desires to apply the same image processing to the same images included in a document, the user may mark only one of those images and just turn on designation area correlation button TP8. Consequently, operation by a user can be simplified since only one area may be designated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus comprising:

means for inputting an original image;

means for designating a region in said original image;

means for recognizing a specific image in said designated region;

means for inputting image processing instructions for editing the designated region;

means for detecting a detected image in the original image which relates to said recognized image; and means for automatically editing additional regions of the original image that include said detected image by the image processing instructions.

2. The image processing apparatus according to claim 1, wherein said input means is an image reader.

3. The image processing apparatus according to claim 1, wherein said input means is an image data receiving unit.

4. The image processing apparatus according to claim 1, further comprising printing means for outputting an image edited by said editing means.

5. The image processing apparatus according to claim 1, wherein said designating means designates an image region surrounded by a marker in the image.

6. The image processing apparatus according to claim 5, wherein said designating means can designate a plurality of regions corresponding to colors of the marker, and said editing means applies a prescribed editing to each region corresponding to a color of the marker.

7. The image processing apparatus according to claim 1, wherein said designating means includes a display portion displaying an input image and an input portion inputting a designation region based on the image displayed on the display portion.

8. The image processing apparatus according to claim 7, wherein said display portion displays the designation region indicated by a marker included in the image.

9. The image processing apparatus according to claim 8, further comprising means for setting a prescribed editing procedure for the designation region indicated by the marker displayed on said display portion.

10. The image processing apparatus according to claim 1, wherein said recognizing means distinguishes a character present in the region, and said detecting means detects the distinguished character from the input image.

11. The image processing apparatus according to claim 1, wherein said detected image which relates to said recognized image is the same as said recognized image.

12. The image processing apparatus according to claim 1, wherein said detected image which relates to said recognized image is similar to said recognized image.

13. The image processing apparatus according to claim 1, wherein the image processing instructions are for editing the specific image.

14. A method of processing an image comprising the steps of:

inputting an original image;

designating a region in said original image;

inputting image processing instructions for editing the designated region;

recognizing a specific image in said designated region;

detecting a detected image in the original image which relates to said recognized image; and automatically editing additional regions of the original image that include said detected image by the image processing instructions.

15. The method of processing an image according to claim 14, further comprising a step of outputting an edited image onto a sheet.

16. The method of processing an image according to claim 14, wherein said step of inputting an image is executed using an image reader.

17. The method of processing an image according to claim 14, wherein a character present in the region is distinguished in said recognizing step, and the distinguished character is detected from the input image in said detecting step.

18. The method of processing an image according to claim 14, wherein said detected image which relates to said recognized image is the same as said recognized image.

19. The method of processing an image according to claim 14, wherein said image which relates to said recognized image is similar to said recognized image.

20. The method of processing an image according to claim 14, wherein the image processing instructions are for editing the specific image.

* * * * *